United States Patent
Beisty et al.

(10) Patent No.: US 8,719,173 B2
(45) Date of Patent: May 6, 2014

(54) COLLABORATIVE PORTAL SYSTEM FOR BUSINESS LAUNCH CENTERS AND OTHER ENVIRONMENTS

(75) Inventors: John Beisty, Chicago, IL (US); Joseph Iacoviello, Reading, MA (US); Colin Dangel, Brookline, MA (US); Timothy von Herrmann, Lincoln, MA (US); Melanie Payne, Franklin, MA (US); Steve Pantier, Reston, VA (US); Woodruff W. Driggs, II, Wellesley, MA (US)

(73) Assignee: Accenture Global Services Limited, Dublin (IE)

( * ) Notice: Subject to any disclaimer, the term of this patent is extended or adjusted under 35 U.S.C. 154(b) by 2574 days.

(21) Appl. No.: 10/259,840

(22) Filed: Sep. 30, 2002
(Under 37 CFR 1.47)

(65) Prior Publication Data
US 2003/0163547 A1 Aug. 28, 2003

Related U.S. Application Data

(60) Provisional application No. 60/325,214, filed on Sep. 28, 2001.

(51) Int. Cl.
*G06Q 10/00* (2012.01)

(52) U.S. Cl.
USPC ......... 705/300; 705/301; 705/7.22; 705/7.23; 705/7.26

(58) Field of Classification Search
USPC ....................... 705/300, 301, 7.22, 7.23, 7.26
See application file for complete search history.

(56) References Cited

U.S. PATENT DOCUMENTS

| | | | | |
|---|---|---|---|---|
| 6,608,636 | B1 * | 8/2003 | Roseman | 715/753 |
| 6,862,585 | B2 * | 3/2005 | Planalp et al. | 707/1 |
| 7,072,940 | B1 * | 7/2006 | Day et al. | 709/204 |
| 2001/0047290 | A1 * | 11/2001 | Petras et al. | 705/10 |
| 2002/0049713 | A1 * | 4/2002 | Khemlani et al. | 707/1 |
| 2002/0069099 | A1 * | 6/2002 | Knox et al. | 705/8 |
| 2002/0069210 | A1 * | 6/2002 | Navani et al. | 707/104.1 |
| 2002/0133395 | A1 * | 9/2002 | Hughes et al. | 705/11 |
| 2002/0147777 | A1 * | 10/2002 | Hackbarth et al. | 709/205 |

(Continued)

FOREIGN PATENT DOCUMENTS

CA 2347723 A1 * 5/2000

OTHER PUBLICATIONS

Google Patent Searches, Dec. 15, 2013, 2 pages.*

(Continued)

*Primary Examiner* — Dean T Nguyen
(74) *Attorney, Agent, or Firm* — Finnegan, Henderson, Farabow, Garrett & Dunner, LLP

(57) ABSTRACT

A business-to-business relationship portal (e.g., a web site or the like interface to a network or web-based computer system) facilitates the communications and activities of individuals and entities in collaborative business environments. Preferably, a network-based portal is provided that supports large-scale, e.g., global, needs. The portal preferably provides a community of stakeholders with a set of core capabilities beneficial to support business objectives. The most preferred embodiments of the invention are employed in an exemplary environment pertaining to launch centers for new business, companies or entities, which can be particularly advantageous to a launch center community of stakeholders such as: launch centers; venture capitalists; consulting companies; market units; prospects; marketing and public relations; and/or service providers.

25 Claims, 51 Drawing Sheets

(56) References Cited

U.S. PATENT DOCUMENTS

| | | | |
|---|---|---|---|
| 2003/0009362 A1* | 1/2003 | Cifani et al. | 705/7 |
| 2003/0055652 A1* | 3/2003 | Nichols et al. | 704/275 |
| 2004/0010518 A1* | 1/2004 | Montemer | 707/104.1 |

OTHER PUBLICATIONS

Craig, J., E-Business Readiness: a Customer Focused Framework, Addison-Wesley Information Technology Series, 2001, pp. 1-3.*

Jutla, D.N., A Methodology for Creating e-Business Strategy, Proceedings of the 34th Hawaii International Conference on System Sciences—2001, pp. 1-10.*

GoogleScholar Searches, Dec. 15, 2013, pp. 1-2.*

Inkpen, A., Creating Knowledge through Collaboration, California Management Review, 1996, pp. 123-138.*

* cited by examiner

Ship Portal

- SHOW ME NOTICES FROM THE LAST: FIVE DAYS ▶ [EDIT]

- LOGIN
  - DAY
  - TWO DAYS
  - THREE DAYS
  - FIVE DAYS
  - TEN DAYS

- IEX CARD SUBSCRIPTIONS

- NEW SUBSCRIPTIONS SINCE 5 DAYS AGO

- LINKS

Create/Modify Task .com launch centre — relationship portal

TASK DETAILS

STATUS: OPEN

TASK: [▼] ← STEP 3

DESCRIPTION: [            ] ← STEP 4

START DATE: [    ] 31
DD-MMM-YYYY

DUE DATE: [    ] 31 ← STEP 5
DD-MMM-YYYY

ASSIGN WORK FLOW

ASSIGNED TO: [        ] [SELECT] ← STEP 6

ACCEPTANCE BY: [        ] [SELECT]

LATE ESCALATION: [        ] [SELECT]

COMMENTS: [            ]

ASSOCIATIONS ← STEP 10

ADD ASSOCIATIONS: [SELECT FROM... ▼] [GO]

STEP 11
[DONE] [CANCEL]

FIG. 10A

FIG. 12B
FIG. 12C
FIG. 12D
FIG. 12E

TO FIG. 13C (CONT.)

*FROM FIG. 13C*

| | | | |
|---|---|---|---|
| ASIA PACIFIC | | | |
| MELBOURNE | o | o | o |
| SINGAPORE | o | o | o |
| SYDNEY | o | o | o |
| TOKYO | o | o | o |
| ASIA PACIFIC TOTAL: | o | o | o |
| EMEIA | | | |
| COPENHAGEN | o | o | o |
| DUBLIN | o | o | o |
| FRANKFURT | o | o | o |
| HELSINKI | o | o | o |
| JOHANNESBURG | o | o | o |
| LONDON | o | o | o |
| MADRID | o | o | o |
| MILAN | o | o | o |
| OSLO | o | o | o |
| PARIS | o | o | o |
| SAO PAULO | o | o | o |
| STOCKHOLM | o | o | o |
| EMEIA TOTAL: | o | o | o |
| GLOBAL TOTALS: | 2 | o | o |

*FIG. 13C (CONT.)*

Launch Centre Summary — launch centre relationship portal

SELECT: DALLAS ▼ | PRINT VIEW

DALLAS LAUNCH CENTRE SUMMARY

NOTE: ALL AMOUNTS ARE US$ IN THOUSANDS

| OPPORTUNITY | OWNER | STAGE | PROJECTED NET FEES | PROJECTED CASH MARGIN | PROJECTED MARGIN % | AC SWEAT EQUITY | AC CASH EQUITY | OWNERSHIP VALUE AT IPO |
|---|---|---|---|---|---|---|---|---|
| CATTLE | BRIAN PETERS | LEAD | $0 | $0 | 0% | $0 | $0 | $0 |
| OIL.COM | SARA OLSEN | LEAD | $0 | $0 | 0% | $0 | $0 | $0 |
| RADNET | MELANIE O'NEIL | LEAD | $0 | $0 | 0% | $0 | $0 | $0 |
| TOTALS: | | | $0 | $0 | | $0 | $0 | $0 |

*FIG. 13D*

*FROM FIG. 13E*

| | | | | | |
|---|---|---|---|---|---|
| ASIA PACIFIC | | | | | |
| MELBOURNE | 0 | $0 | $0 | $0 | $0 |
| SINGAPORE | 0 | $0 | $0 | $0 | $0 |
| SYDNEY | 0 | $0 | $0 | $0 | $0 |
| TOKYO | 0 | $0 | $0 | $0 | $0 |
| ASIA PACIFIC TOTAL: | 0 | $0 | $0 | $0 | $0 |
| EMEIA | | | | | |
| COPENHAGEN | 0 | $0 | $0 | $0 | $0 |
| DUBLIN | 0 | $0 | $0 | $0 | $0 |
| FRANKFURT | 0 | $0 | $0 | $0 | $0 |
| HELSINKI | 0 | $0 | $0 | $0 | $0 |
| JOHANNESBURG | 0 | $0 | $0 | $0 | $0 |
| LONDON | 0 | $0 | $0 | $0 | $0 |
| MADRID | 0 | $0 | $0 | $0 | $0 |
| MILAN | 0 | $0 | $0 | $0 | $0 |
| OSLO | 0 | $0 | $0 | $0 | $0 |
| PARIS | 0 | $0 | $0 | $0 | $0 |
| SAO PAULO | 0 | $0 | $0 | $0 | $0 |
| STOCKHOLM | 0 | $0 | $0 | $0 | $0 |
| EMEIA TOTAL: | 0 | $0 | $0 | $0 | $0 |
| GLOBAL TOTALS: | 0 | $0 | $0 | $0 | $0 |

*TOTAL AC INVESTMENT = AC SWEAT EQUITY + AC CASH EQUITY

*FIG. 13E (CONT.)*

Global Summary .com launch centre
relationship portal

DOT-COM LAUNCH CENTRE ACTIVITY REPORT
GLOBAL SUMMARY - REVENUE
NOTE: ALL AMOUNTS ARE US$ IN THOUSANDS

REGION: [SELECT A REGION ▼] [PRINT VIEW]

| LAUNCH CENTRE | PROPOSED ENGAGEMENTS ||| SOLD ENGAGEMENTS |||
|---|---|---|---|---|---|---|
| | QUANTITY | PROJECTED GROSS FEES | TOTAL AC INVESTMENT* | QUANTITY | PROJECTED GROSS FEES | TOTAL AC INVESTMENT* |
| AMERICAS | | | | | | |
| ATLANTA | 0 | $0 | $0 | 0 | $0 | $0 |
| BOSTON | 0 | $0 | $0 | 0 | $0 | $0 |
| CHICAGO | 0 | $0 | $0 | 0 | $0 | $0 |
| DALLAS | 0 | $0 | $0 | 0 | $0 | $0 |
| HOUSTON | 0 | $0 | $0 | 0 | $0 | $0 |
| LOS ANGELES | 0 | $0 | $0 | 0 | $0 | $0 |
| MINNEAPOLIS | 0 | $0 | $0 | 0 | $0 | $0 |
| NEW YORK | 0 | $0 | $0 | 0 | $0 | $0 |
| PHILADELPHIA | 0 | $0 | $0 | 0 | $0 | $0 |
| SAN FRANCISCO | 0 | $0 | $0 | 0 | $0 | $0 |
| SEATTLE | 0 | $0 | $0 | 0 | $0 | $0 |
| SILICON VALLEY | 0 | $0 | $0 | 0 | $0 | $0 |
| TALLAHASSEE | 0 | $0 | $0 | 0 | $0 | $0 |
| TORONTO | 0 | $0 | $0 | 0 | $0 | $0 |
| WASHINGTON D.C. | 0 | $0 | $0 | 0 | $0 | $0 |
| AMERICAS TOTAL: | 0 | $0 | $0 | 0 | $0 | $0 |

*FROM FIG. 13F*

| | | | | | |
|---|---|---|---|---|---|
| ASIA PACIFIC | | | | | |
| MELBOURNE | 0 | $0 | $0 | 0 | $0 |
| SINGAPORE | 0 | $0 | $0 | 0 | $0 |
| SYDNEY | 0 | $0 | $0 | 0 | $0 |
| TOKYO | 0 | $0 | $0 | 0 | $0 |
| ASIA PACIFIC TOTAL: | 0 | $0 | $0 | 0 | $0 |
| EMEIA | | | | | |
| COPENHAGEN | 0 | $0 | $0 | 0 | $0 |
| DUBLIN | 0 | $0 | $0 | 0 | $0 |
| FRANKFURT | 0 | $0 | $0 | 0 | $0 |
| HELSINKI | 0 | $0 | $0 | 0 | $0 |
| JOHANNESBURG | 0 | $0 | $0 | 0 | $0 |
| LONDON | 0 | $0 | $0 | 0 | $0 |
| MADRID | 0 | $0 | $0 | 0 | $0 |
| MILAN | 0 | $0 | $0 | 0 | $0 |
| OSLO | 0 | $0 | $0 | 0 | $0 |
| PARIS | 0 | $0 | $0 | 0 | $0 |
| SAO PAULO | 0 | $0 | $0 | 0 | $0 |
| STOCKHOLM | 0 | $0 | $0 | 0 | $0 |
| EMEIA TOTAL: | 0 | $0 | $0 | 0 | $0 |
| GLOBAL TOTALS: | 0 | $0 | $0 | 0 | $0 |

*TOTAL AC INVESTMENT = AC SWEAT EQUITY + AC CASH EQUITY

*FIG. 13F (CONT.)*

Global Summary .com launch centre
*relationship portal*

REGION: EMEIA ▼ | PRINT VIEW

DOT-COM LAUNCH CENTRE ACTIVITY REPORT
EMEIA SUMMARY - REVENUE

NOTE: ALL AMOUNTS ARE US$ IN THOUSANDS

| LAUNCH CENTRE | PROPOSED ENGAGEMENTS ||| SOLD ENGAGEMENTS |||
|---|---|---|---|---|---|---|
| | QUANTITY | PROJECTED GROSS FEES | TOTAL AC INVESTMENT* | QUANTITY | PROJECTED GROSS FEES | TOTAL AC INVESTMENT* |
| EMEIA | | $0 | $0 | | $0 | $0 |
| COPENHAGEN | | $0 | $0 | | $0 | $0 |
| DUBLIN | | $0 | $0 | | $0 | $0 |
| FRANKFURT | | $0 | $0 | | $0 | $0 |
| HELSINKI | | $0 | $0 | | $0 | $0 |
| JOHANNESBURG | | $0 | $0 | | $0 | $0 |
| LONDON | | $0 | $0 | | $0 | $0 |
| MADRID | | $0 | $0 | | $0 | $0 |
| MILAN | | $0 | $0 | | $0 | $0 |
| OSLO | | $0 | $0 | | $0 | $0 |
| PARIS | | $0 | $0 | | $0 | $0 |
| SAO PAULO | | $0 | $0 | | $0 | $0 |
| STOCKHOLM | | $0 | $0 | | $0 | $0 |
| EMEIA TOTAL: | 0 | $0 | $0 | 0 | $0 | $0 |
| GLOBAL TOTALS: | 0 | $0 | $0 | 0 | $0 | $0 |

*TOTAL AC INVESTMENT= AC SWEAT EQUITY + AC CASH EQUITY

FIG. 13H

Create Opportunity

.com launch centre
○ ○ ○ ○ relationship portal

NOTE: REQUIRED FIELDS ARE IN RED

*COMPANY INFORMATION*
COMPANY NAME: [ ]  ← STEP 3
ADDRESS 1: [ ]
ADDRESS 2: [ ]
CITY/TOWN: [ ]
STATE/PROVINCE: [SELECT STATE ▼] (US AND CANADA ONLY)
COUNTRY: [SELECT COUNTRY ▼]
ZIP/POSTAL CODE: [ ]
MAIN PHONE: [ ]
WEB URL: [ ]

*PRIMARY COMPANY CONTACT*
FIRST NAME: [ ]
MIDDLE INITIAL: [ ]
LAST NAME: [ ]
JOB TITLE: [ ]
E-MAIL ADDRESS: [ ]
PHONE NUMBER: [ ]
FAX NUMBER: [ ]

*OPPORTUNITY INFORMATION*
LAUNCH CENTRE: [BOSTON ▼]
OPPORTUNITY OWNER: [ ] [ASSOCIATE OWNER] ← STEP 4
SEND OWNER EMAIL NOTIFICATION: ☐
OPPORTUNITY NAME: [ ]
OPPORTUNITY SOURCE: [ ]
CREATED BY:       ALLAN V ABELOW
DESCRIPTION:
(4000 CHARACTER LIMIT)    ← STEP 7

[                                    ]

← STEP 8
[DONE]  [CANCEL]

Search Results - .com launch centre - relationship portal

RECORDS (1-4 OF 4)
NO SEARCH CRITERIA SELECTED

MODIFY SEARCH CRITERIA    PRINT VIEW

| COMPANY | OWNER | COACH | STAGE | DATE CREATED | LAUNCH CENTRE | MARKET UNIT | OPERATING UNIT | TOTAL AC INVESTMENT |
|---|---|---|---|---|---|---|---|---|
| 1. ABC<br>TECHNOLOGIES:<br>DESCRIPTION: TEST | MELANIE PAYNE | UNDEFINED | LEAD | | BOSTON | UNDEFINED | UNDEFINED | $0 |
| 1. JUNK.COM<br>TECHNOLOGIES:<br>DESCRIPTION: JHK | CARMEN ABRAHAM | UNDEFINED | LEAD | | ATLANTA | UNDEFINED | UNDEFINED | $0 |
| 1. SHOPLINK<br>TECHNOLOGIES:<br>DESCRIPTION: SHOPLINK DELIVERS GROCERIES ORDERED ONLINE THROUGH THEIR WEBSITE. | MELANIE PAYNE | UNDEFINED | PROPOSED | | BOSTON | UNDEFINED | UNDEFINED | $0 |
| 1. ESPEED<br>TECHNOLOGIES:<br>DESCRIPTION: TEST | MELANIE PAYNE | UNDEFINED | LEAD | | BOSTON | UNDEFINED | UNDEFINED | $0 |
| COMPANY | OWNER | COACH | STAGE | DATE CREATED | LAUNCH CENTRE | MARKET UNIT | OPERATING UNIT | TOTAL AC INVESTMENT |

MODIFY SEARCH CRITERIA

FIG. 15B

Opportunity-Profile.com launch centre
*relationship portal*

| PROFILE | COMMUNICATIONS | CONTACTS | FILE CATALOG | EQUITY & VALUATION | PROJECT FINANCIALS |

SUBSCRIBED: [N]

[SAVE] [CANCEL] remember click the "Save" button to save your work    FOR: SHOPLINK

OPPORTUNITY INFORMATION

| | | | |
|---|---|---|---|
| OPPORTUNITY NAME: | [SHOPLINK] | COMPANY: | [SHOPLINK] |
| ADDRESS 1: | [1 MAIN ST.] | ADDRESS 2: | [ ] |
| CITY: | [WESTWOOD] | STATE/PROVINCE: | [MASSACHUSETTS ▼] |
| COUNTRY: | [USA ▼] | ZIP/POSTAL CODE: | [00000] |
| PHONE: | [000-000-0000] | | |
| CREATED BY: | ALAN ABELOW | DATE CREATED: | 10-AUG-2000 |
| DESCRIPTION: (4000 CHARACTER LIMIT) | SHOPLINK DELIVERS GROCERIES ORDERED ONLINE THROUGH THEIR WEBSITE. | | |

| | | |
|---|---|---|
| OPPORTUNITY OWNER: | [CHRIS O'CONNELL] | [ASSOCIATE OWNER] |
| DOT-COM COACH: | [CHRIS O'CONNELL] | [SELECT COACH] |
| OPPORTUNITY SOURCE: | [ ] | |

Opportunity Profile launch centre
relationship portal

SUBSCRIBED: N

| PROFILE | COMMUNICATIONS | CONTACTS | FILE CATALOG | EQUITY & VALUATION | PROJECT FINANCIALS |

| SAVE | CANCEL | remember...
click the "Save" button to save your work

FOR: SHOPLINK

COMPANIES ASSOCIATED WITH OPPORTUNITY

| COMPANY NAME | ADDRESS | CITY | STATE/PROVINCE | ZIP | MAIN PHONE | WEB SITE |
|---|---|---|---|---|---|---|
| ATLANTA | 1 ATLANTA WAY | ATLANTA | GEORGIA | 11111-1111 | 111-111-1111 | |
| BOSTON | 1 BOSTON WAY | BOSTON | MASSACHUSETTS | 11111-1112 | 222-222-2222 | |
| SHOPLINK | 1 MAIN ST. | WESTWOOD | MASSACHUSETTS | 00000 | 000-000-0000 | |

[SELECT COMPANY]

CONTACTS ASSOCIATED WITH OPPORTUNITY

| LAST | FIRST | COMPANY | JOB TITLE | WORK PHONE | EMAIL | ACCOUNT STATUS |
|---|---|---|---|---|---|---|
| ABELOW | ALLAN | BOSTON | | 617-454-4954 | COCONNELL@RADNET.COM | ACTIVE |
| O'CONNEL | CHRIS | BOSTON | | 617-454-8706 | COCONNELL@RADNET.COM | ACTIVE |
| PAYNE | MELANIE | BOSTON | | 617-454-7331 | MELANIE.R.PAYNE@AC.COM | DISABLED |

[SELECT CONTACT] NOTE: IN ORDER TO ADD A CONTACT, YOU MUST ADD THE CONTACT'S COMPANY FIRST

Create Alert .com launch centre ○ ○ ○ ○ *relationship portal*

SELECT ALERT RECIPIENTS

TO: (NONE SELECTED) [SELECT GROUPS] ← STEP 3
[SELECT USERS]

ENTER ALERT DETAILS

SUBJECT: [_____] ← STEP 7

← STEP 8

DETAILS:
(4000
CHARACTER
LIMIT)

ASSOCIATIONS ← STEP 9

ADD ASSOCIATIONS: [SELECT FROM... ▼] [GO]

← STEP 10
[DONE] [CANCEL]

*FIG. 17A*

Add/Modify Content .com launch centre
relationship portal

STEP 1: ENTER DETAILS OF THE CONTENT YOU WISH TO CREATE.

TITLE: ⟵ STEP 3

DESCRIPTION:

STEP 2: SELECT FOLDER(S) IN WHICH TO PLACE THE CONTENT.

FOLDERS: [ADD] [REMOVE]
⟵ STEP 4

STEP 3: ATTACH FILE OR URL.

[ATTACH] ⟵ STEP 7
FILE NAME: UNKNOWN
FILE SIZE: UNKNOWN          LAST MODIFIED: UNKNOWN
FILE TYPE: UNKNOWN

STEP 4: ASSOCIATE PORTAL CONTENT, IF NECESSARY.

ADD ASSOCIATIONS: [SELECT FROM....▼] [GO] ⟵ STEP 10

[CANCEL] [NEXT>>] ⟵ STEP 11

FIG. 18A

Select From Catalog

○ ○ ○ ○ relationship portal

| SELECT ALL | DESELECT ALL | EXPAND ALL | COLLAPSE ALL |

- ☐ HOTLINKS
- ☐ MENU LINKS
- ☐ ACCENTURE KNOWLEDGE CAPITAL
  - ☐ FOLDER 1 ← STEP 5
    - ☐ FOLDER 2
  - ☐ EXTERNAL PARTIES
- ☐ OPPORTUNITIES
  - ☐ FISH EXCHANGE OPPORTUNITY
  - ☐ ARGO DEVELOPMENT OPPORTUNITY
- ☐ LAUNCH CENTRE
  - ☐ BOSTON
  - ☐ ATLANTA
  - ☐ LOS ANGELES
  - ☐ CHICAGO ← STEP 6

| DONE | CANCEL |

*FIG. 18B*

Create/Modify Folder

.com launch centre
relationship portal

STEP 1: ENTER FOLDER DETAILS

FOLDER NAME: [_____] ← STEP 3

FOLDER DESCRIPTION: [_____]

STEP 2: SELECT PARENT FOLDER ← STEP 4

PARENT FOLDER: [SELECT]

FOLDER TYPE:

STEP 3: ADD EXISTING PORTAL CONTENT(S) TO FOLDER, IF NECESSARY

CONTENTS: [ADD] ← STEP 7

[CANCEL] [NEXT>>] ← STEP 8

FIG. 18E

COLLABORATIVE PORTAL SYSTEM FOR BUSINESS LAUNCH CENTERS AND OTHER ENVIRONMENTS

The present application claims priority to U.S. Provisional Application Ser. No. 60/325,214, filed on Sep. 28, 2001, entitled Collaborative Portal System For Business Launch Centers And Other Environments, the entire disclosure of which is incorporated herein in its entirety as though recited herein in full.

BACKGROUND

1. Field of the Invention

The present invention relates generally to network-based business-to-business (B-2-B) and the like collaborative processes. The preferred embodiments provide a network or web-based system and method for, among other things, facilitating the exchange of information between parties in business launch centers and other environments.

2. Description of the Preferred Environments

The preferred embodiments of the present invention can be employed in various collaborative processes. Illustrative collaborative processes include, as some examples: a) management and technology consulting services and solutions business processes, including, e.g., business launch center processes; b) relationship management processes, including, e.g., customer relationship management (CRM) and partner relationship management (PRM) processes; and c) other collaborative processes involving multiple companies and/or entities.

With respect to management and technology consulting services and solutions businesses, a consulting firm, such as ACCENTURE™, the assignee of the present invention, may provide management and/or technology consulting services and solutions business processes that are enhanced by its various affiliations, alliances and/or venture capital connections. Related activities often involve the collaboration of efforts between individuals both internal and external to the consulting firm.

With respect to customer relationship management (CRM) and partner relationship management (PRM), CRM may include, for example, the overall processes of marketing, sales and/or services within an organization. PRM, a subset of CRM, may include, for example, the application of relationship management strategies and technologies to the needs of indirect sales channels or the like. These activities may also involve the collaboration of efforts between individuals both inside and outside of a particular organization.

Exemplary collaborative processes within which the most preferred embodiments of the present invention can be employed are used in business launch center environments. A business launch center may, for example, provide new businesses, including startups and corporate spin-outs, with the resources to rapidly and successfully build, launch and scale their business. For example, a launch center may bring clients a blend of skilled people, a range of business and technology assets and a network of business and technology alliances. A launch center may provide people with expertise in substantially all aspects of starting up a new venture—e.g., from business plan creation, to launching, to scaling. A launch center may include an alliance network having local and/or global partners (e.g., venture capital firms, law firms, technology partners, accounting planners, tax planners, etc.) that are all able to leverage their offerings and/or expertise for the new company. A launch center may, for example, leverage appropriate assets and connect a company with preferred partners. A launch center may also assist in accelerating the build-out of, as some examples, some of the following business capabilities: strategy and business development; alliance management; marketing and sales; products and services development; fulfillment and logistics; financial management; and/or organizational development. In some cases, a plurality of launch centers can be established, with each covering portions of a marketplace, such as geographic sections of a marketplace.

Various preferred embodiments of the present invention can be used to greatly facilitate the above and/or other collaborative processes.

SUMMARY OF THE PREFERRED EMBODIMENTS

In preferred embodiments of the invention, a business-to-business relationship portal (e.g., a web site or the like interface to a network or web-based computer system) is provided that facilitates the communications and activities of individuals and entities in a collaborative business environment. The various aspects of the present invention can be employed in a variety of business-to-business collaborative processes, such as, for example, in the processes of the illustrative environments described above.

In preferred embodiments, a network-based portal is provided that supports large-scale, e.g., global, needs. The portal preferably provides a community of stakeholders with a set of core capabilities beneficial to support business objectives.

The preferred embodiments may support rapid information sharing, collaboration and/or decision making among a community of stakeholders (e.g., within a launch center community). The preferred embodiments may potentially provide one or more of a variety of benefits and advantages:

providing a user friendly system across a diverse community of stakeholders:
  facilitating the ability of 3rd parties (e.g., venture capitalists [VCs], prospects, market unit personnel, etc.) to do business with an organization (e.g., a launch center);
  providing core, value added, end-user functionality to various parties participating in collaborative processes (e.g., for both internal parties and external parties);
providing a single region-wide, e.g., global, solution; and/or
providing automation of key, high leverage and/or high value cross-stakeholder processes.

The most preferred embodiments of the invention are employed in an exemplary environment pertaining to launch centers for new business, companies or entities. The preferred embodiments of the present invention can be used to support the needs of a new company (e.g., e-business entities, commonly referred to as "dot-coms," or various other new companies or the like) and/or a launch center community of stakeholders.

In the preferred embodiments of the invention, the capabilities of the system are particularly advantageous to the following entities, which are typically within a launch center "community of stakeholders:" launch centers; venture capitalists; consulting companies; market units; prospects; marketing and public relations; and/or service providers.

The preferred embodiments of the present invention may provide one or more of the following capabilities to various users of the system in some preferred embodiments: a) the ability to create, review, modify and/or share documents; b) the ability to define formal and/or ad-hoc business processes;

c) the ability to segment information between projects and/or between user groups; d) the ability to manage a fluid set of projects and/or participants; e) the ability to "push" and "pull" information across stakeholder groups in a personalized fashion; f) the ability to provide graphical representations of data; g) the ability to provide enhanced discussions, notifications and/or alerts; h) the ability to provide calendar functioning; i) the ability to provide management reporting; and/or j) the ability to provide pipeline management.

The above and/or other aspects, features, advantages and/or benefits of various embodiments of the present invention will be further appreciated in view of the following description in conjunction with the accompanying figures. It should be appreciated that various embodiments will include and/or exclude different aspects, features, advantages and/or benefits of the present invention and that descriptions of aspects, features, advantages and/or benefits of the various embodiments should not be construed as limiting other embodiments nor the inventions claimed.

BRIEF DESCRIPTION OF THE DRAWINGS

The accompanying drawings, which are incorporated in and constitute a part of this disclosure, illustrate several embodiments of the invention and together with the description, serve to explain the principles of the invention. In the drawings:

Figure 7D:
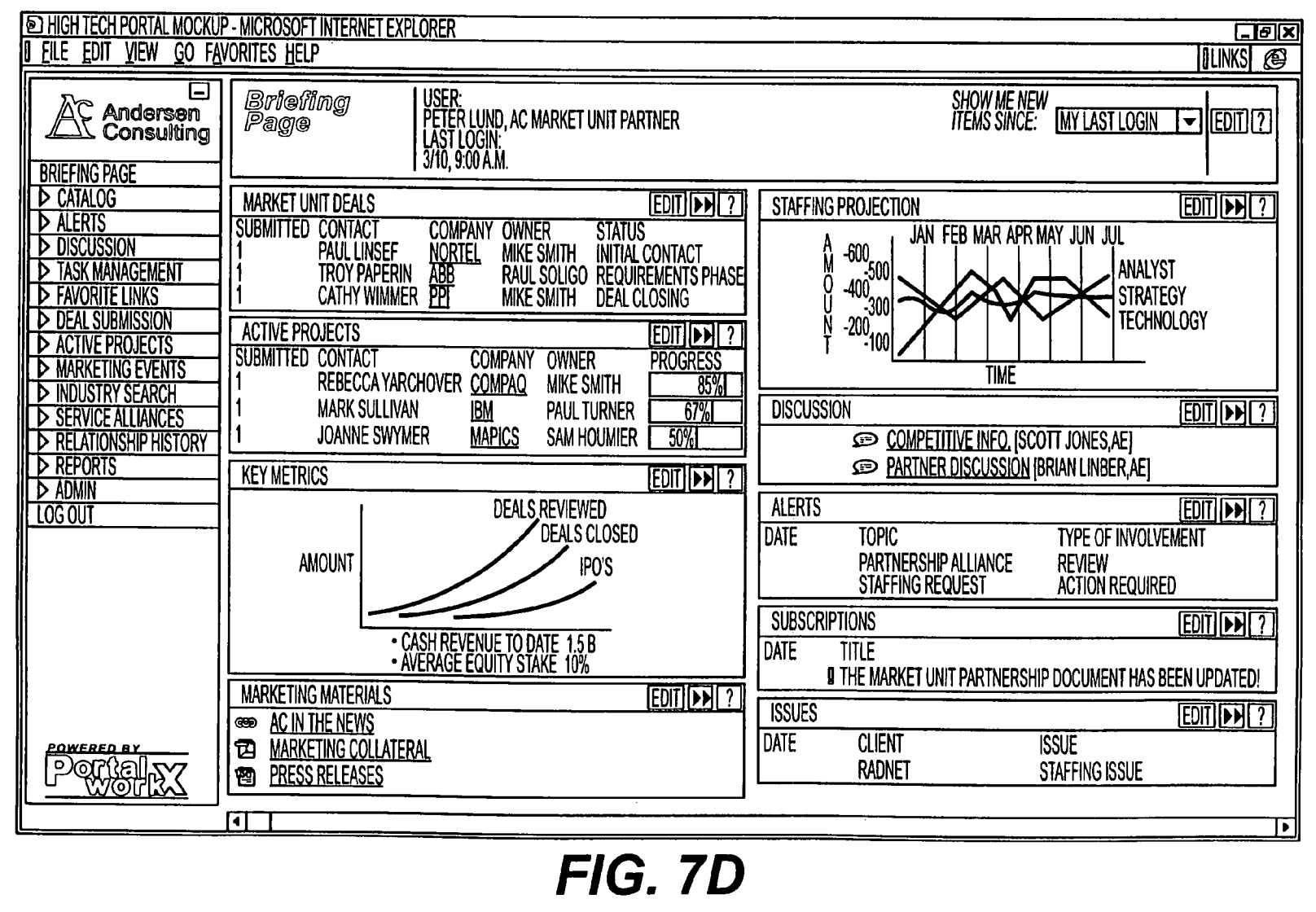

FIGS. 7A, 7C and 7D show screens for illustrative briefing pages;

FIG. 7B illustrates a screen for changing time horizons on a briefing page;

FIG. 10A illustrates a screen for creating a task;

FIGS. 12B-12E illustrate screens for viewing a discussion;

FIG. 13D illustrates a screen for viewing a launch center summary report;

FIGS. 13F-13H illustrate screens for viewing regional summary reports;

FIGS. 14A and 14B illustrate screens for creating an opportunity;

FIGS. 15A and 15B illustrate screens for searching for an opportunity;

FIG. 16C illustrates a screen for a contacts tab of an opportunity profile page;

FIG. 16E illustrates a screen for an equity and evaluation tab of an opportunity profile page;

FIG. 17A illustrates a screen for creating an alert;

FIGS. 18A-18C illustrate screens for adding content to an opportunity;

FIG. 18E illustrates a screen for creating a content folder for an opportunity;

DETAILED DESCRIPTION OF THE PREFERRED EMBODIMENTS

The preferred embodiments of the present invention provide a system that enables entities involved in collaborative processes (e.g., in global launch center processes or in other collaborative processes) to manage "opportunities" more effectively and/or more efficiently. In the most preferred business-launch-center embodiments, opportunities may correspond to new businesses or entities around which collaborative efforts take place. In various other embodiments involving other collaborative processes, "opportunities" may correspond to any other topics around which other collaborative processes take place.

The preferred embodiments of the present invention are implemented using a network (e.g. such as the world wide web, the Internet, a wide area network (WAN) or any other network of computers or the like) having at least one client computer (e.g., a personal computer, lap top computer, personal digital assistant or any other computer device or system) and at least one server for providing information to the client computers via the network. The client computers and server(s) can include any appropriate computers. Illustrative computers can include, e.g.: a central processing unit; memory (e.g., RAM, etc.); digital data storage (e.g., hard drives, etc.); input/output ports (e.g., parallel and/or serial ports, etc.); data entry devices (e.g., key boards, etc.); etc. The client computers preferably contain browser software for interacting with the server(s), such as, for example, using hypertext transfer protocol (http) to make requests of the server(s) via the Internet or the like. Applicable browser software can include, as merely some examples, NETSCAPE, MICROSOFT INTERNET EXPLORER, LYNX, etc. In the preferred embodiments, an application executing on the server preferably supports at least both NETSCAPE and MICROSOFT INTERNET EXPLORER.

Figure 1:
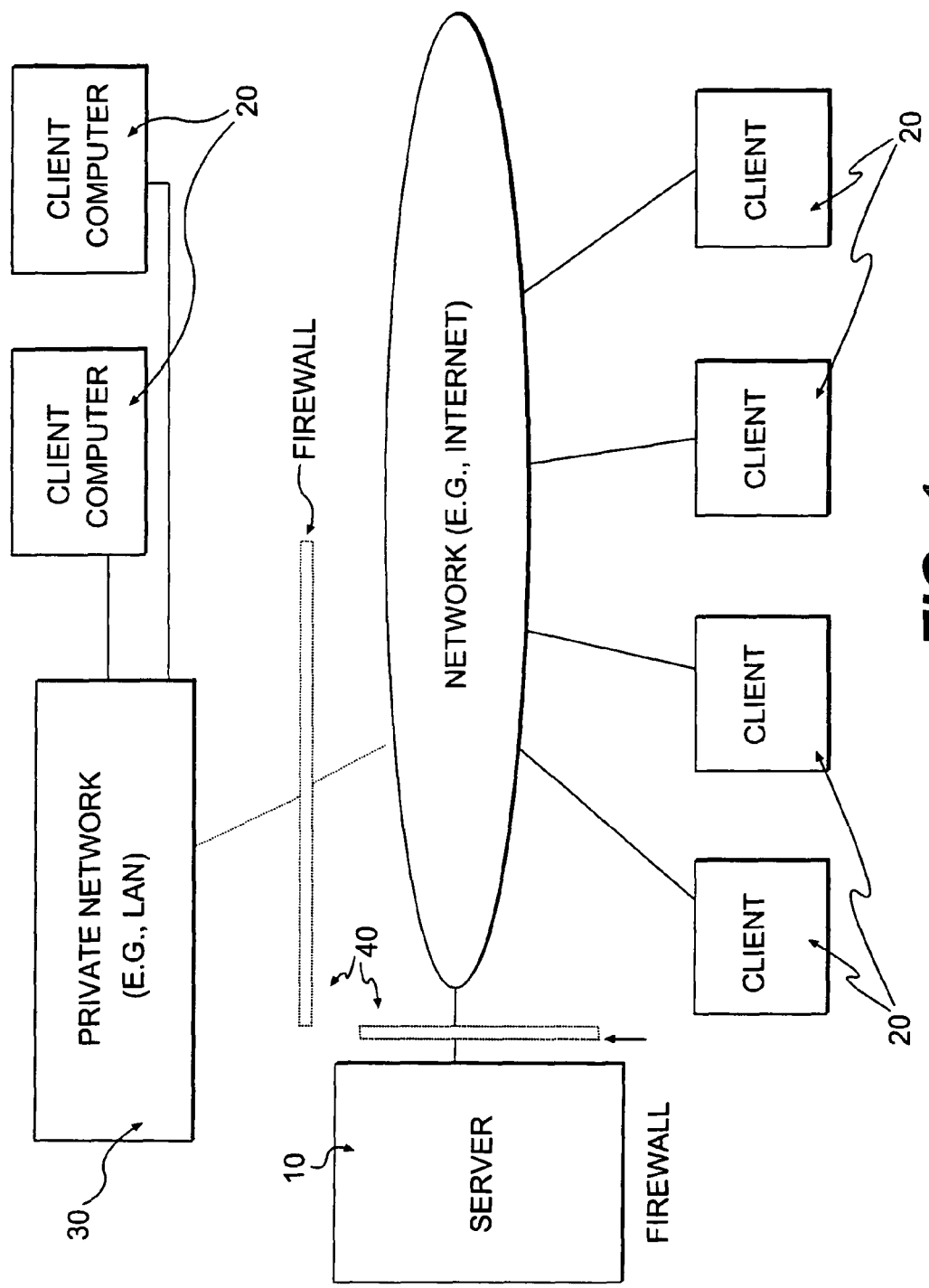
FIG. 1 shows an illustrative environment within which some embodiments can be employed.

FIG. 1 shows an illustrative environment within which some preferred embodiments of the present invention can be employed. As shown, a server 10 can be provided that supports the application of the present invention (e.g., creating a web site for users to access via browser software executing on their client computers 20, whether external to or internal to one or more private network, such as a local area network [LAN] 30, virtual private network [VPN] or other private network). Depending on circumstances, a private network and/or a server 10 may be situated behind a firewall 40 as shown in dashed lines.

In one illustrative embodiment, the following architecture may be used for the system: operating system (e.g., WIN NT); application server (e.g., IIS); server-side Java VM (e.g., MICROSOFT); database server (e.g., Oracle 81 (8.1.5)); database connectivity (e.g., Oracle 8.1.6 Client with the 8.1.6.1 [patched] ODBC Driver); login mechanism (e.g., application login page); encryption (e.g., SSL on all or substantially all pages); mail server (e.g., SMTP [on application server]). Preferably, a web-server/application-server will be on one machine and a database server will be on one machine. Preferably, the system will provide an Internet deployed application.

Preferred embodiments enable entities involved in collaborative processes (e.g., such as launch centers or the like) to conduct business via the Internet with their external partners, clients or the like. Preferred embodiments also establish a web-based portal framework that will enable integration with various legacy systems, such as LOTUS NOTES.

In preferred embodiments of the invention involving multiple centers (e.g., multiple launch centers or the like), each center has a designated administrator or set of administrators and each respective opportunity has an assigned owner.

Illustrative Preferred Embodiment

In an illustrative preferred embodiment of the invention, a network web site or portal is provided that includes some or all of the following features and functions.

Login Page:

Preferably, a standard login page to the application will be provided that will authenticate internal users and/or external users. For example, a new user may be provided a username, a password and a URL or the like for logging into the portal. In preferred embodiments, at least the first time a new user enters the system, the user is presented with a confidentiality and/or non-disclosure agreement that the user must affirmatively agree to (e.g., by clicking on yes) before the user may enter and use the site. In preferred embodiments, the user login is used to identify permissioning (e.g., discussed below) that the user will have within the system.

Figure 2:
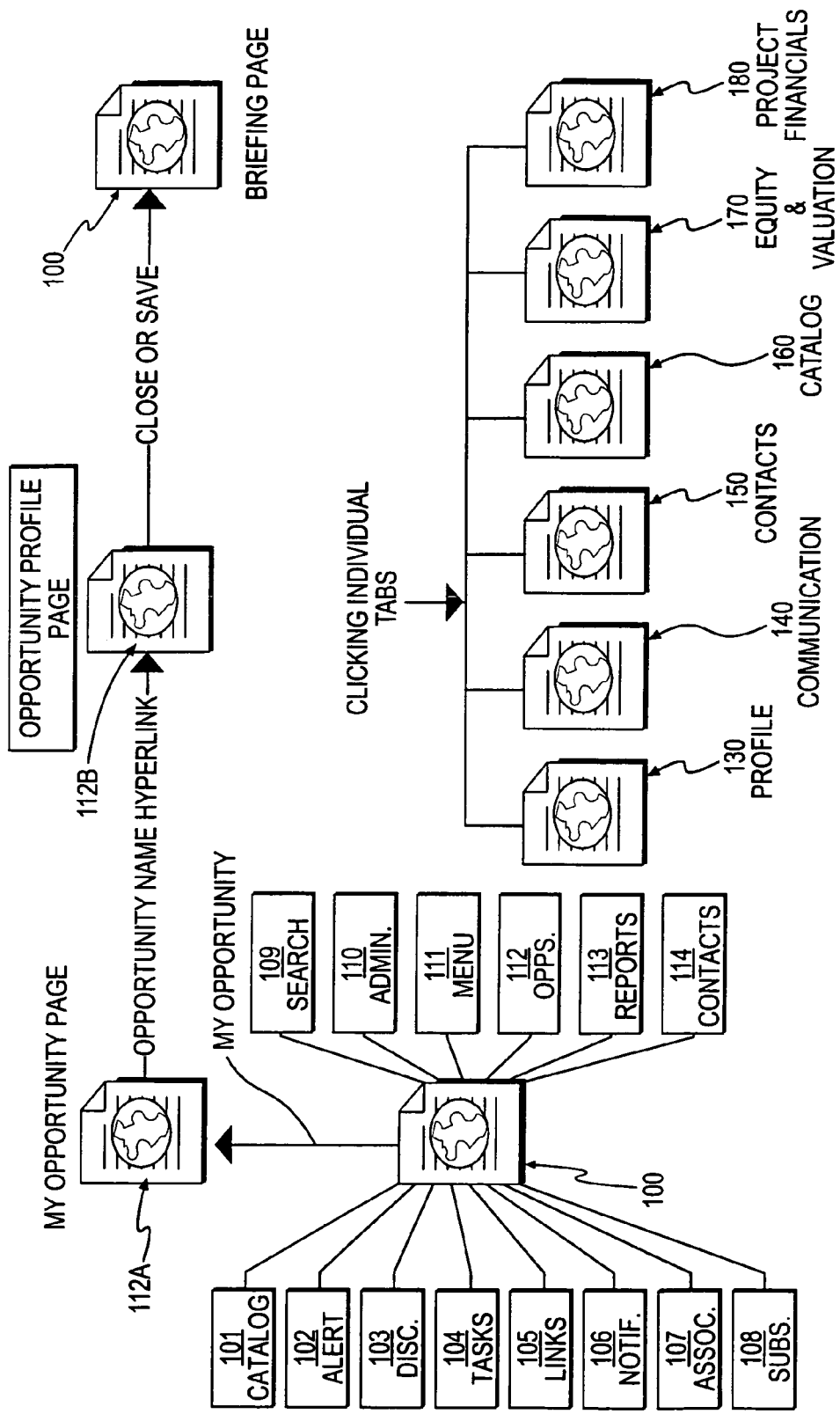
FIGS. 2, 3 and 4 illustrate user navigation for the opportunity functions according to some embodiments.

Briefing Page:

With reference to FIG. 2, a "briefing page" 100 is preferably provided that serves as a personal home page displaying "channels." The briefing page is preferably the main page presented to a user upon successful login. The channels may include summaries of aggregated data from a variety of portal and/or non-portal based applications. The briefing page can be used as a workspace where one can collect his noteworthy information in an aggregate summary. The channels preferably appear as boxes on the user's screen and contain links to respective portal items. The briefing page preferably funnels new, specific information into a concise, summary format for a particular user.

Preferably, the channel structure is flexible and each channel can be rearranged on the briefing page. A briefing page configuration page is preferably provided that enables customization of the briefing page. In preferred embodiments, a user can customize his briefing page according to preference. Preferably, a user can decide which channels he wishes to see and where he wants to position the channels on the page. The content of the individual channels is preferably customizable.

In preferred embodiments, the briefing page may contain preloaded alerts, discussions and/or tasks, as well as short cuts to useful links and to opportunities. The user's briefing page is preferably configured based on default settings that are different for internal users and external or third party users.

Catalog:

With reference to FIG. 2, a "catalog" 101 (e.g., see also 160 in FIG. 2) is preferably provided that serves as a user-created taxonomy that provides access to content items. Preferably, folders (e.g., arranged by categories) within the catalog store documents. Documents can preferably include any known document format, such as, as just some of a multitude of examples, image documents, such as portable document format (PDF) documents, JPEG documents, etc., word processing documents, such as MICROSOFT WORD documents, WORDPERFECT documents, etc., and various other electronic documents. In some preferred embodiments, documents can be uploaded to the web server via the Internet using file transfer protocol (ftp) to transfer documents between computers.

Alerts:

With reference to FIG. 2, an "alert" function 102 is preferably provided as a means of communication (e.g., see also 140 in FIG. 2) that allows users to send their business partners brief messages that require timely attention. Among other things, alerts help manage the real-time processes that occur around business content.

Discussions:

With reference to FIG. 2, a "discussion" function 103 is preferably provided as a means of communication (e.g., see also 140 in FIG. 2) that enables discussions that are generally parallel to discussion boards found on the Internet. Preferably, a user posts a message and other users reply to that message. Users can preferably reply to the original message and/or can reply to a specific reply. Discussions can help to collaboratively manage content by enabling users to hold a discussion with select users and/or groups of users and to "associate" relevant items in the portal. Preferably, this process allows relevant content to the discussion to be easily accessed by participants.

Tasks:

With reference to FIG. 2, a "tasks" function 104 is provided as a means of communication (e.g., see also 140 in FIG. 2) that enables the assignment and tracking of tasks related to a project. Among other things, this may facilitate the identification and display of progress towards key opportunity and/or project milestones.

Menu Links:

With reference to FIG. 2, a "menu links" function 105 is preferably provided that allows users to define hyperlinked or the like access to content items or web sites.

Notifications:

With reference to FIG. 2, a "notification" function 106 is preferably provided that allows e-mail messages to be sent outside the portal to reach people when particular items in the portal require their attention. Preferably, users choose the specific portal information for which they will receive notifications.

Associations:

With reference to FIG. 2, an "associations" function 107 is preferably provided that dynamically creates hyperlinks to other items in the portal. The associations preferably facilitate communication around a specific piece of business content and are helpful for collaboration. Associations can be used to greatly facilitate collaboration surrounding business content (e.g., such as surrounding a document or the like).

Subscriptions:

With reference to FIG. 2, a "subscriptions" function 108 is preferably provided that allows for the automated monitoring of portal items. Subscriptions preferably notify a user when a content item has been updated or changed.

Search:

With reference to FIG. 2, a "search" function 109 is preferably provided that allows users to search the catalog content within the portal or to search predefined collections of web sites and/or file systems that the system administrator has created. Users can preferably save catalog search results for later reuse. In preferred embodiments, the search results are updated automatically whenever users add new content to the portal that qualifies the search criteria.

Administration:

With reference to FIG. 2, an "administration" function 110 is preferably provided that allows a user with proper permissions to view, create, modify and/or delete other users, groups and/or companies. In preferred embodiments, users can also view and modify their own profile.

Start Menu:

With reference to FIG. 2, a "start menu" function 111 is preferably provided that includes a persistent menu that provides access to specific views and functions.

Opportunities:

With reference to FIG. 2, an "opportunity" function 112 is preferably provided that enables portal users to capture, view and/or maintain information on opportunities (e.g., via a "my opportunities" or "my opportunity" page 112A, an "opportunity profile" page 112B or the like as shown in FIG. 2). Depending upon permissions, users may be enabled to view and/or modify information for an opportunity, such as for example profile information, company background information and/or financial information for an opportunity (see, for example, illustrative tabs 130, 140, 150, 160, 170 and/or 180 shown in FIG. 2).

Reports:

With reference to FIG. 2, a "reports" function 113 is preferably provided that allows users to view, search and/or report on the current status of a pipeline. Depending upon permissions, users may be enabled to see summarized pipeline information at the individual level (e.g., at an individual launch center level) or at a wide area level (e.g., globally or the like, such as for example across all launch centers).

Contact Lists:

With reference to FIG. 2, a "contact list" function 114 is preferably provided that gives users the ability to view individual contacts from group or company contact information.

Preferred Permissioning

In some preferred embodiments, at least some of the following permissioning is provided for users of the collaborative process portal system. In the following preferred but non-limiting examples, users that are employed by or otherwise specially affiliated with or entrusted by an entity having control over the portal system are considered to be "internal" users. Preferably, other users may be classified as "external" users. The permissioning described below is used in some preferred embodiments of the invention, such as for example in the most preferred embodiments discussed below pertaining to business-launch-center environments. Alternative permissioning can be selected based on circumstances surrounding the collaborative processes and/or needs in various other embodiments of the invention.

Opportunities:

Preferably, all internal users are permissioned to have read/view access to opportunities. All internal users added to an opportunity contact list are preferably permissioned to have edit/modify/create access to edit all parts of the opportunity. In addition, all internal users on an opportunity contact list can preferably grant ready/modify permissions for that opportunity.

Profile

Preferably, internal users have read/view access and all internal users added to the opportunity contact list can edit all parts of the opportunity. Preferably, external users on the contact list have read/view access (NB: in some preferred embodiments, external users may be prevented from viewing certain aspects, such as for example, stage and/or days at stage in business launch center environments). Moreover, external users preferably cannot edit a profile, unless granted that permission.

Financials

In embodiments wherein financial information is presented, all internal users preferably have read/view access and all internal users on the contact list can preferably edit financials. In preferred embodiments, no external users have read/view access to view financials.

Contacts

Preferably, all internal users have read/view access and internal users added to the opportunity contact list can edit contacts. External company users added to the opportunity contact list will preferably have read/view access to contacts, but preferably no external users can edit contacts unless granted that permission.

File Catalog:

Preferably, all internal users have read/view access and internal users added to the opportunity contact list have edit/modify/create access to the catalog. External users added to the opportunity contact list will preferably have read/view access to public categories. Preferably, however, no external users can edit the catalog unless granted that permission. In preferred embodiments, internal users on the opportunity contact list can grant read/modify permissions for the catalog.

Discussions:

Preferably, all internal users will have read/view access and internal users added to the opportunity contact list will have edit/modify/create permissions for discussions. Preferably, external users at company A added to an opportunity contact list will have read/view access to all discussions with users at company B that company A has a relationship with. In preferred embodiments, external users can take part in discussions if the users are on the opportunity's contact list and the user's company has a relationship with the other companies involved. Preferably, external users can only create a discussion with an internal user, and internal users on an opportunity contact list can grant read/modify permission for that opportunity's discussions.

Tasks:

Preferably, all internal users will be given read/view access to tasks and internal users added to the opportunity contact list can edit/modify/create tasks. Preferably, external users at company A added to an opportunity contact list will have read/view access to all tasks with users at company B that company A has a relationship with. External users can preferably take part in tasks if the user is on the opportunity's contact list and the user's company has a relationship with the other companies involved. In some embodiments, external users will only be able to create a task for an internal user. Preferably, internal users on an opportunity contact list can grant read/modify permission for that opportunity's tasks.

Alerts:

Preferably, all internal users will be given read/view access to alerts and internal users added to the opportunity contact list can edit/modify/create alerts. Preferably, external users at company A added to an opportunity contact list will have read/view access to all alerts with users at company B that company A has a relationship with. External users can preferably take part in alerts if the user is on the opportunity's contact list and the user's company has a relationship with the other companies involved. In some embodiments, external users can only create an alert for an internal user. Preferably, internal users on opportunity contact list can grant read/modify permissions for that opportunity's alerts.

Preferred Launch Center or the Like Embodiments

In some preferred embodiments for launch center or the like environments, the portal system can include at least some of the following features.

Figure 7A:
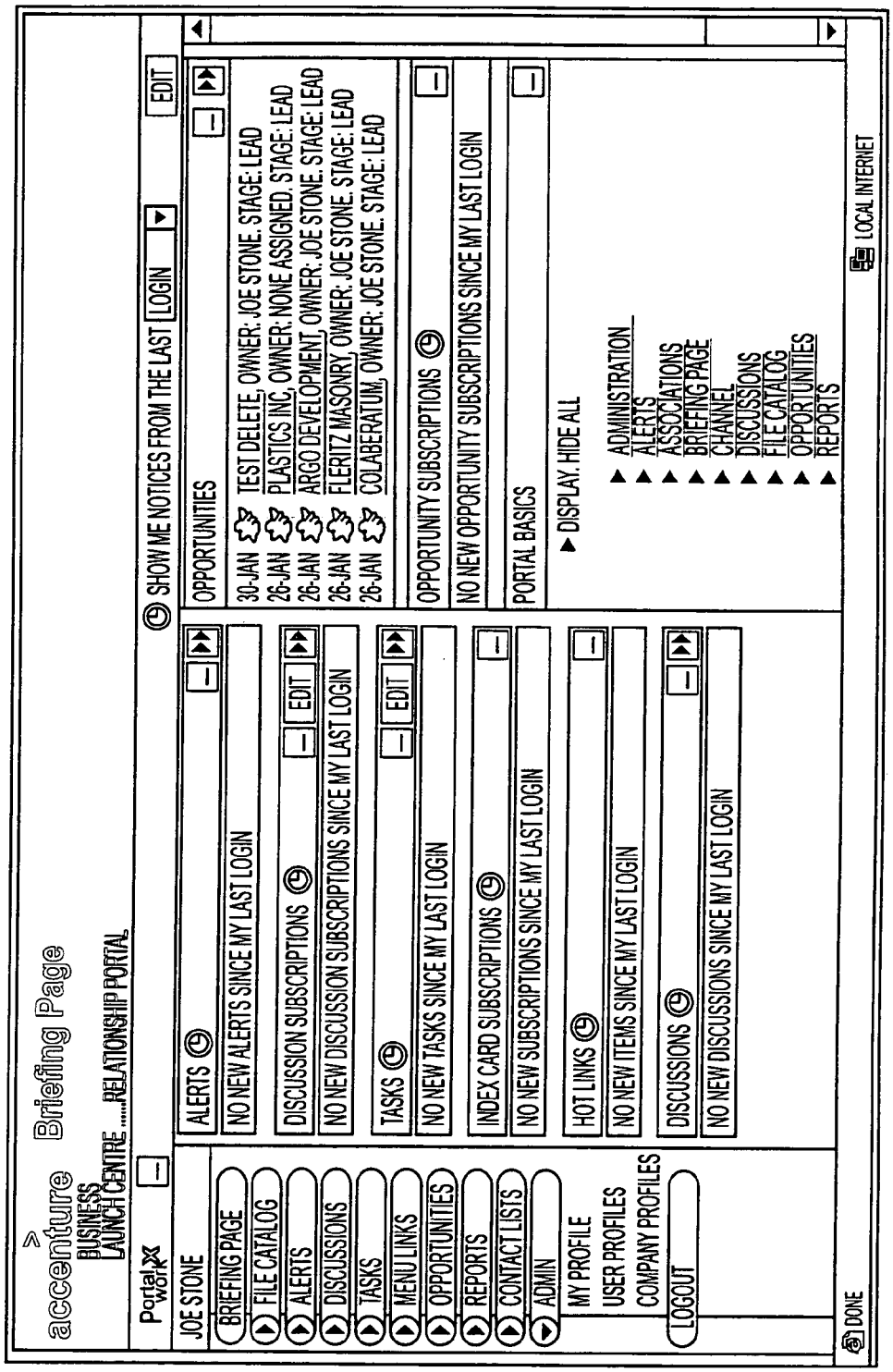
Figure 7C:

Briefing Page:

According to one embodiment, a "briefing page" is provided that serves as a personal "home page" displaying portal "channels." The channels may contain substantially real-time data from the various portal applications. The channels may appear as boxes or regions on the user's screen and contain hyperlinks to portal items. The briefing page preferably funnels new, specific information in a concise, summary format. The briefing page can help to eliminate information overload, to simplify monitoring and to accelerate responses. FIGS. 7A, 7C and 7D show some illustrative briefing pages according to some preferred embodiments of the invention. The embodiment shown in FIG. 7A pertains to a most preferred embodiment described in further detail below. The embodiments shown in FIGS. 7C and 7D show other illustrative channels or features that may be presented on a briefing page in some embodiments, such as information related to market unit deals, active projects, key metrics, marketing materials, staffing projections, getting started, deal shaping, issues, news, relationship implementation and more.

In some preferred embodiments, users may select a specific time-frame for content retrieval and will thus see any new items added to the portal within the selected time-frame. This is referred to herein as the "time horizon." In some illustrative embodiments, time horizoned channels can be indicated by a clock in a channel header.

In an illustrative example, a time horizon can be changed as follows:
  Step 1: As shown in FIG. 7A, a user first clicks on the drop down list box to the right of "show me notices from the last:" in the header.
  Step 2: As shown in FIG. 7B, the user then selects a time horizon.

Figure 8:
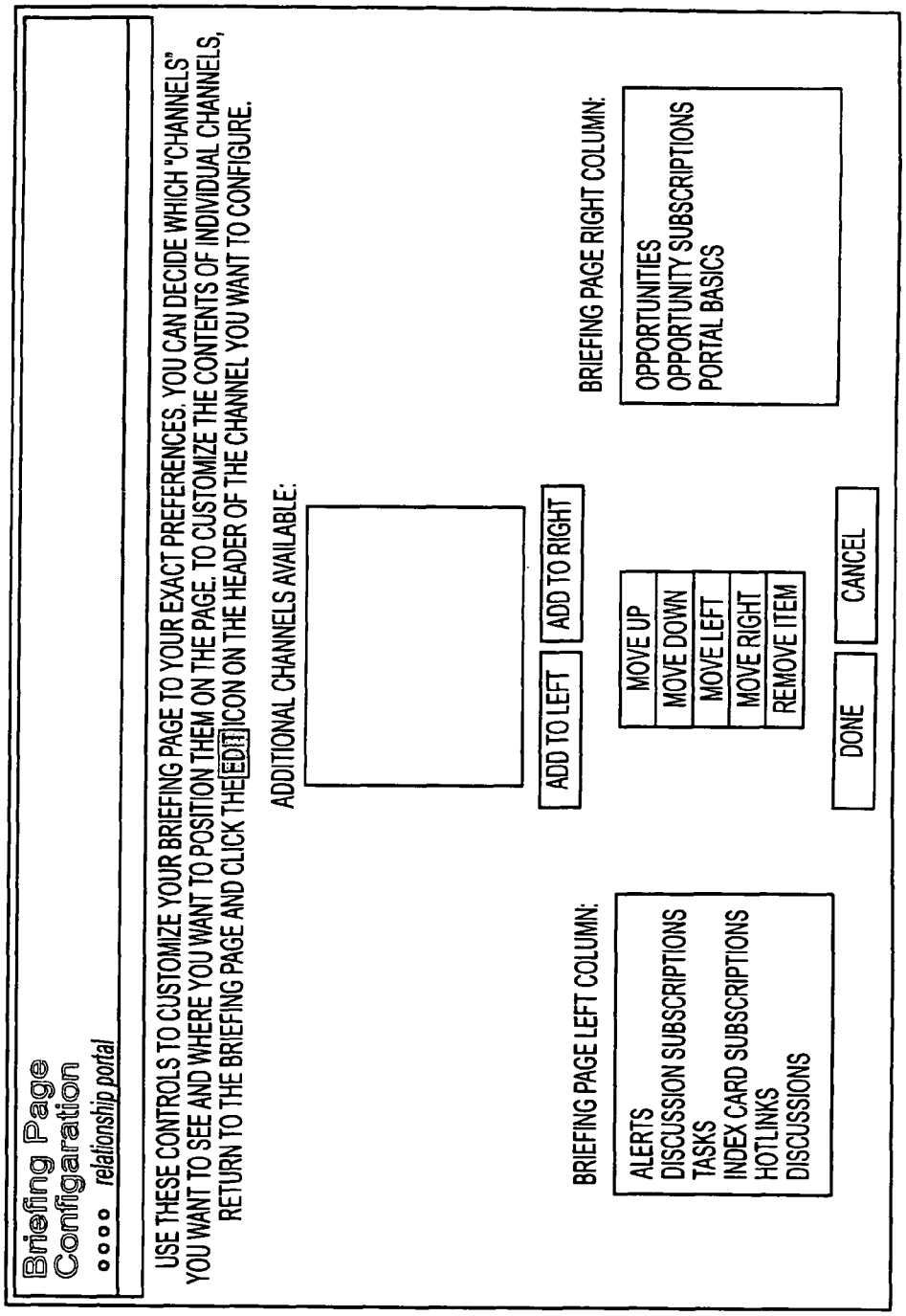
FIG. 8 illustrates a screen for allowing the user to add items to a briefing page.

In preferred embodiments, a user can edit the content appearing on the briefing page. In an illustrative example, the briefing page can be changed using at least some of the following steps:
  Step 1: As shown in FIG. 7A, the user clicks "edit" on the header.
  Step 2: As shown in FIG. 8, the user adds items to the briefing page by using the "add to left" and/or "add to right" buttons.
  Step 3: As shown in FIG. 8, the user removes items from the briefing page by using the "remove item" button.
  Step 4: As shown in FIG. 8, the user changes the order of items on the briefing page by using the "move up," "move down," "move left" and "move right" buttons.
  Step 5: As shown in FIG. 8, the user then clicks "done."

Tasks:

Preferably, tasks allow a user to assign another user a discrete job, which is preferably due on a specific date. In preferred embodiments, users can also associate other items in the portal, such as a specific catalog content item (e.g., a document or the like), to the task. Tasks preferably help manage the processes that occur around business content. Tasks can be helpful, for example, for process management. For example, by assigning tasks with associated portal items, users can more easily manage collaboration around business content. Using a structured tasks component can also help in organizing communication between business partners. Preferably, by using a similar template each time a user assigns a task, users can have greater assurance that the instructions will be understood. In some embodiments, associations are used to reduce ambiguity. For example, it can make it easier to know exactly which document someone is referring to when they "associate" the document with a task.

Figure 9C:
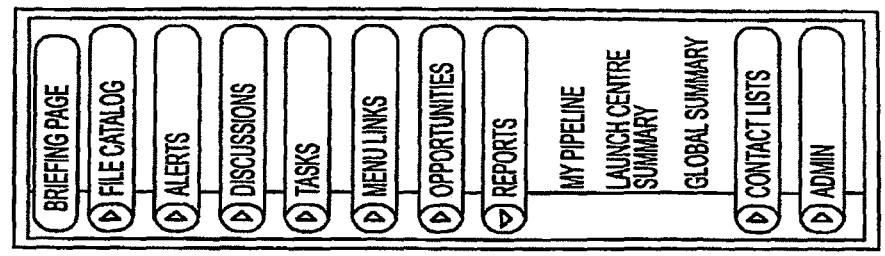
FIGS. 9A-9F illustrate screens showing options in the start menu.
Figure 9B:
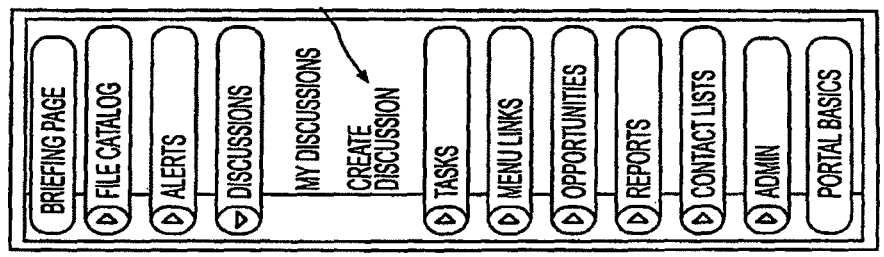
Figure 9A:
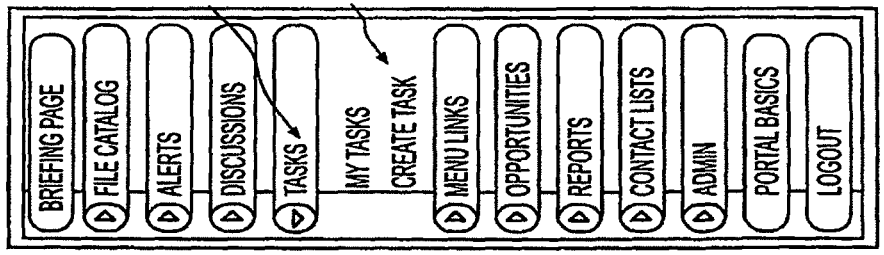
Figure 10B:
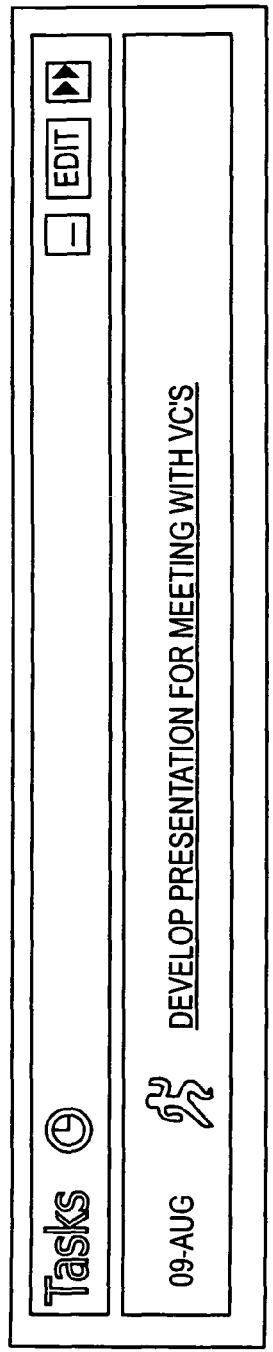
FIGS. 10B and 10C illustrate screens for viewing a task.
Figure 11:
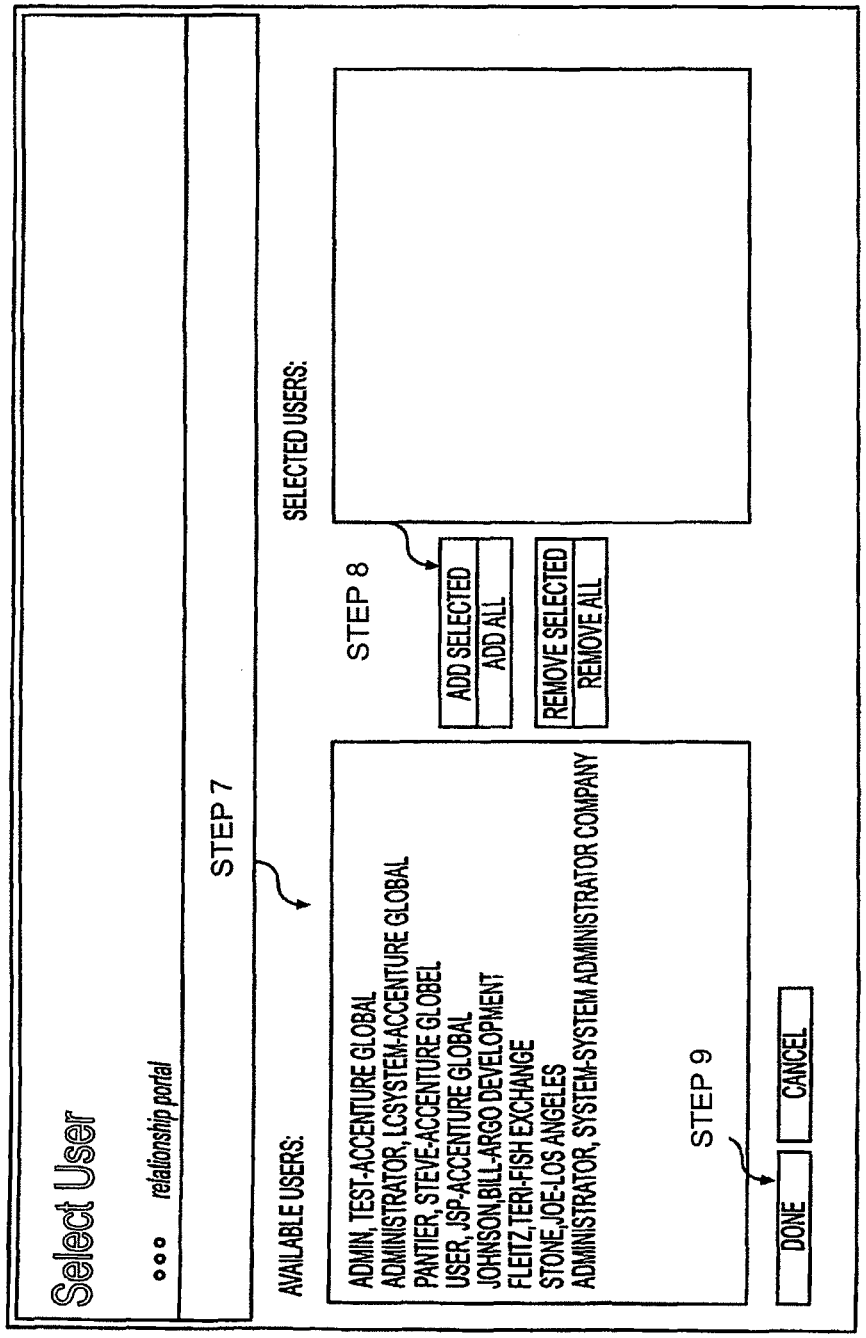
FIG. 11 illustrates a screen for selecting users.

In an illustrative example, a task can be created using some or all of the following steps:
  Step 1: As shown in FIG. 9A, a user clicks tasks on the start menu (or, from the opportunity profile, the user clicks on the "create task" button under the communications tab shown in FIG. 16B).
  Step 2: As shown in FIG. 9A, the user clicks the sub-menu item "create tasks."
  Step 3: As shown in FIG. 10A, the user enters a task (e.g., which will preferably appear in the channel).
  Step 4: As shown in FIG. 10A, the user enters a description.
  Step 5: As shown in FIG. 10A, the user enters a due date.
  Step 6: As shown in FIG. 10A, the user assigns a task to a user by clicking on the "select" button.
  Step 7: As shown in FIG. 11, the user clicks on the user name(s).
  Step 8: As shown in FIG. 11, the user clicks "add selected."
  Step 9: As shown in FIG. 11, the user clicks "done" to add users.
  Step 10: As shown in FIG. 10A, the user adds an association by selecting an object in the drop down menu and clicking "go."
  Step 11: As shown in FIG. 10A, the user clicks "done" to save the task.

Figure 10C:
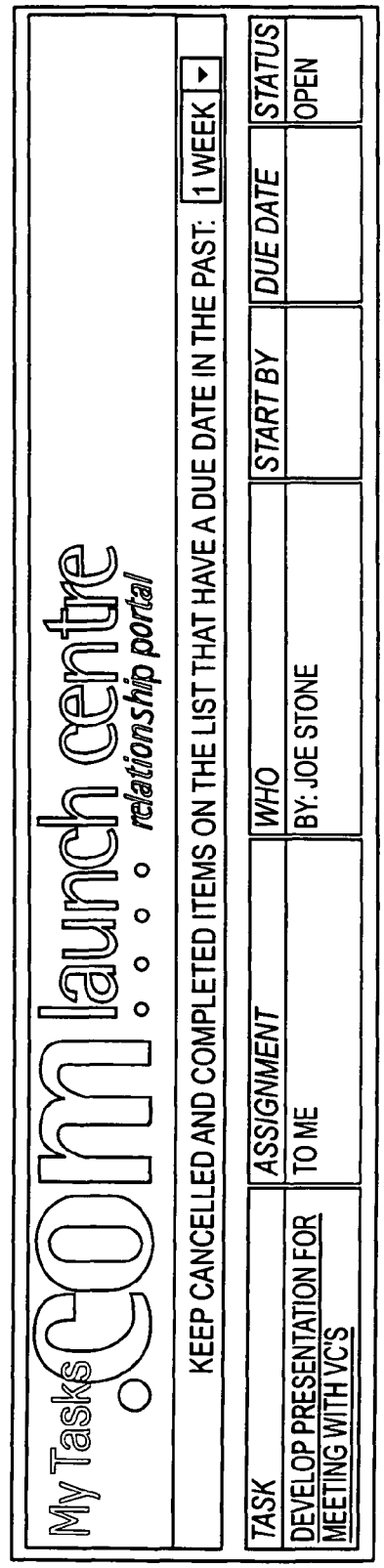

In some illustrative examples, tasks can be viewed in one or more of the following three ways:
  1. From a Communications Tab of an Opportunity Profile
    Step 1: As shown in FIG. 16B, a user preferably clicks on the task title.
  2. From a Tasks Channel
    Step 1: As shown in FIG. 10B, a user preferably clicks on the task title.
  3. From the Start Menu
    Step 1: As shown in FIG. 9A, a user preferably clicks "tasks" on the start menu.
    Step 2: As shown in FIG. 9A, a user preferably clicks the sub-menu item "my tasks."
    Step 3: As shown in FIG. 10C, a user preferably clicks on a task title.

Discussions:

Discussions in the portal are preferably generally parallel to discussion boards found on the Internet. For example, users may post messages and/or reply to posted messages. Preferably, users can reply to an original message and/or can reply to an earlier reply. Discussions can, for example, help to collaboratively manage content by enabling users to hold a discussion with select user(s) or group(s) of users, and to "associate" relevant items in the portal. This process allows, for example, relevant content to the discussion to be easily accessed by all participants.

In an illustrative example, a discussion can be created using at least some of the following steps:

Step 1: As shown in FIG. 9B, a user preferably clicks "discussions" on the start menu (or, from the opportunity profile, the user clicks on the "create discussion" button under the communications tab (FIG. 16B)).

Step 2: As shown in FIG. 9B, a user preferably clicks the sub-menu item "create discussion."

Figure 12A:
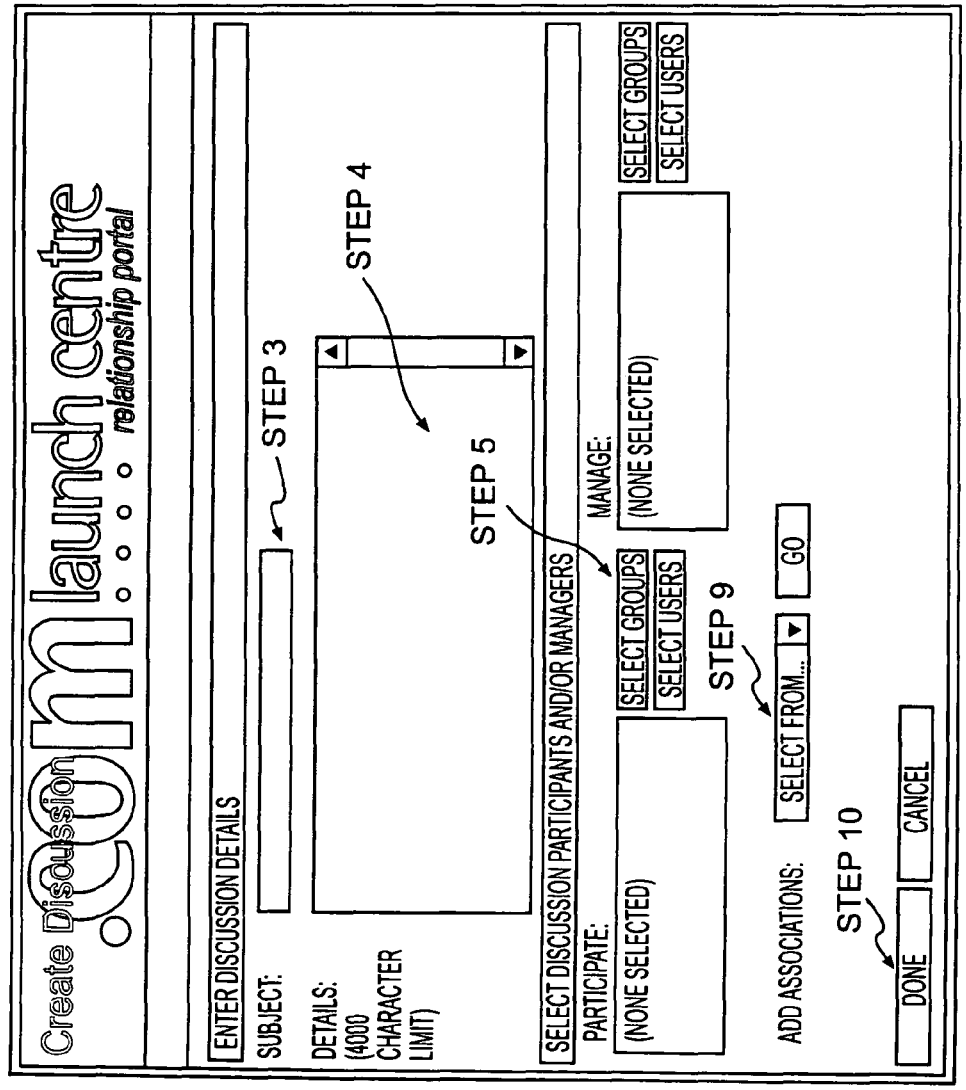
FIG. 12A illustrates a screen for creating a discussion.

Step 3: As shown in FIG. 12A, a user preferably enters a subject (i.e., this will preferably appear in the channel).

Step 4: As shown in FIG. 12A, a user preferably enters discussion details (i.e., a message to be displayed).

Step 5: As shown in FIG. 12A, a user preferably assigns permissions for participation by clicking on "select users" or "select groups."

Step 6: As shown in FIG. 11, a user preferably clicks on user name(s).

Step 7: As shown in FIG. 11, a user preferably clicks "add selected."

Step 8: As shown in FIG. 11, a user preferably clicks "done" to add users.

Step 9: As shown in FIG. 12A, a user preferably adds an association by selecting an object in the drop down menu and clicking "go."

Step 10: As shown in FIG. 12A, a user preferably clicks "done" to send the discussion.

In some illustrative examples, a discussion can be viewed in at least one of four different ways:

1. From a Communications Tab of an Opportunity Profile
   Step 1: As shown in FIG. 16B, a user preferably clicks on a discussion title.
2. From a Start Menu
   Step 1: As shown in FIG. 9B, a user preferably clicks "discussions" on the start menu.
   Step 2: As shown in FIG. 9B, a user preferably clicks the sub-menu item "my discussions."
   Step 3: As shown in FIG. 12B, a user preferably clicks on a discussion title on the "my discussions" page.
   Step 4: As shown in FIG. 12C, a user preferably clicks on a discussion title on the "view discussion" page.
3. From a Discussions Channel
   Step 1: As shown in FIG. 12D, a user preferably clicks on a discussion title in the discussions channel that appears on the user's briefing page.
4. From a Discussion Subscriptions Channel
   Step 1: As shown in FIG. 12E, a user clicks on a discussion thread in the discussion subscriptions channel that appears on the user's briefing page.

Figure 12F:
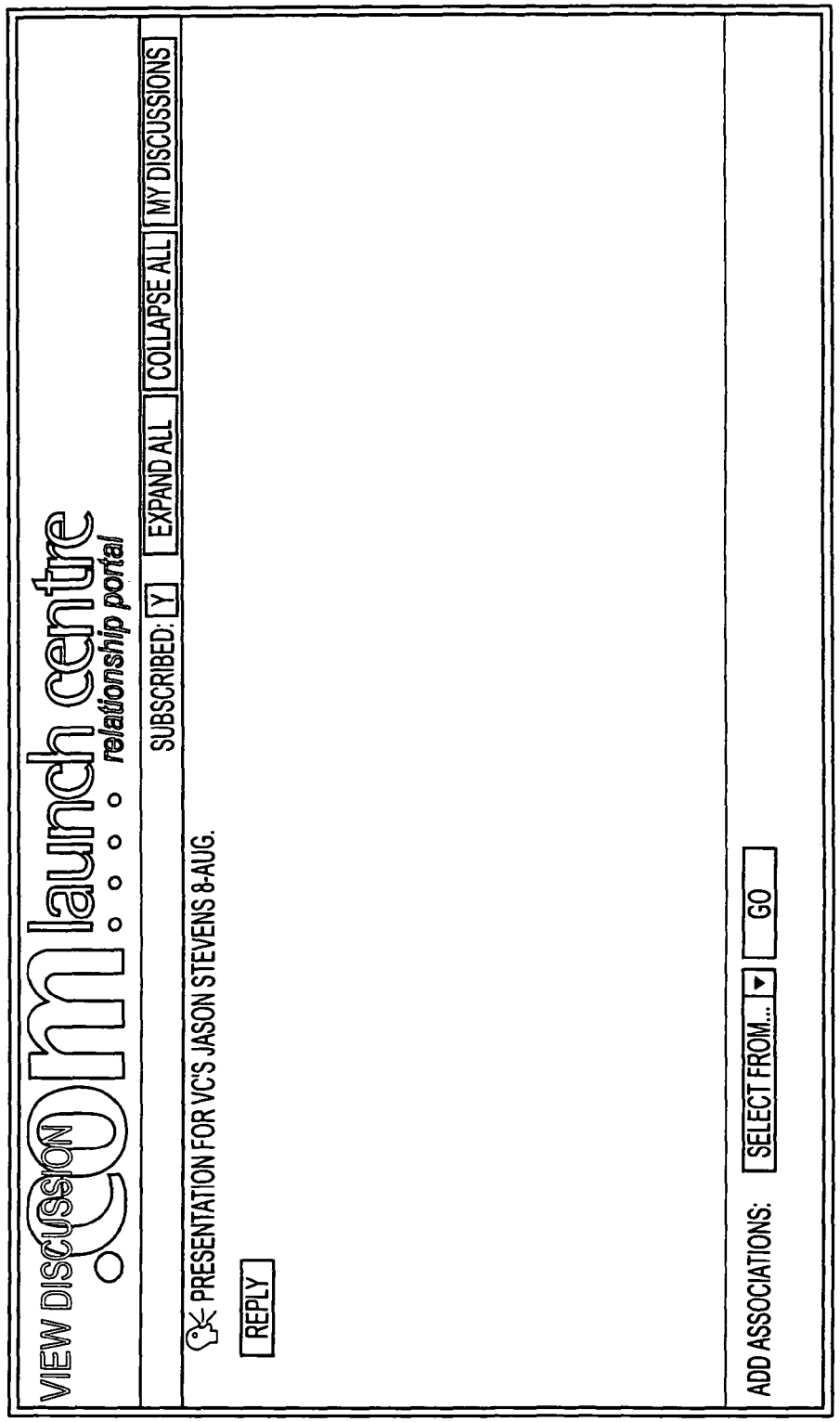
FIG. 12F illustrates a screen for replying to a discussion.

Preferably, to reply to a discussion, while on the view discussion page after clicking on the discussion title, a user clicks reply (see, e.g., FIG. 12F).

Reports:

Preferably, at least three different categories of reports are available. A first category includes pipeline reports which preferably list opportunities grouped by stages. A second category of reports are summary views which preferably list all opportunities in a selected center (e.g., launch center), and preferably along with financial information related to each opportunity. A third category is a global summary with information provided at the center level. Preferably, each of these reports provides links that allow the user to drill down to an opportunity profile view.

Preferably, there are three different types of pipeline reports. FIG. 9C shows a link to a first type, "my pipeline," which provides a view of all opportunities on which a particular user is listed as a contact. In some preferred embodiments, the opportunities are grouped into columns based on their current stage. The opportunity names preferably contain embedded hyperlinks to a respective opportunity profile page for the respective opportunities.

Figure 13A:
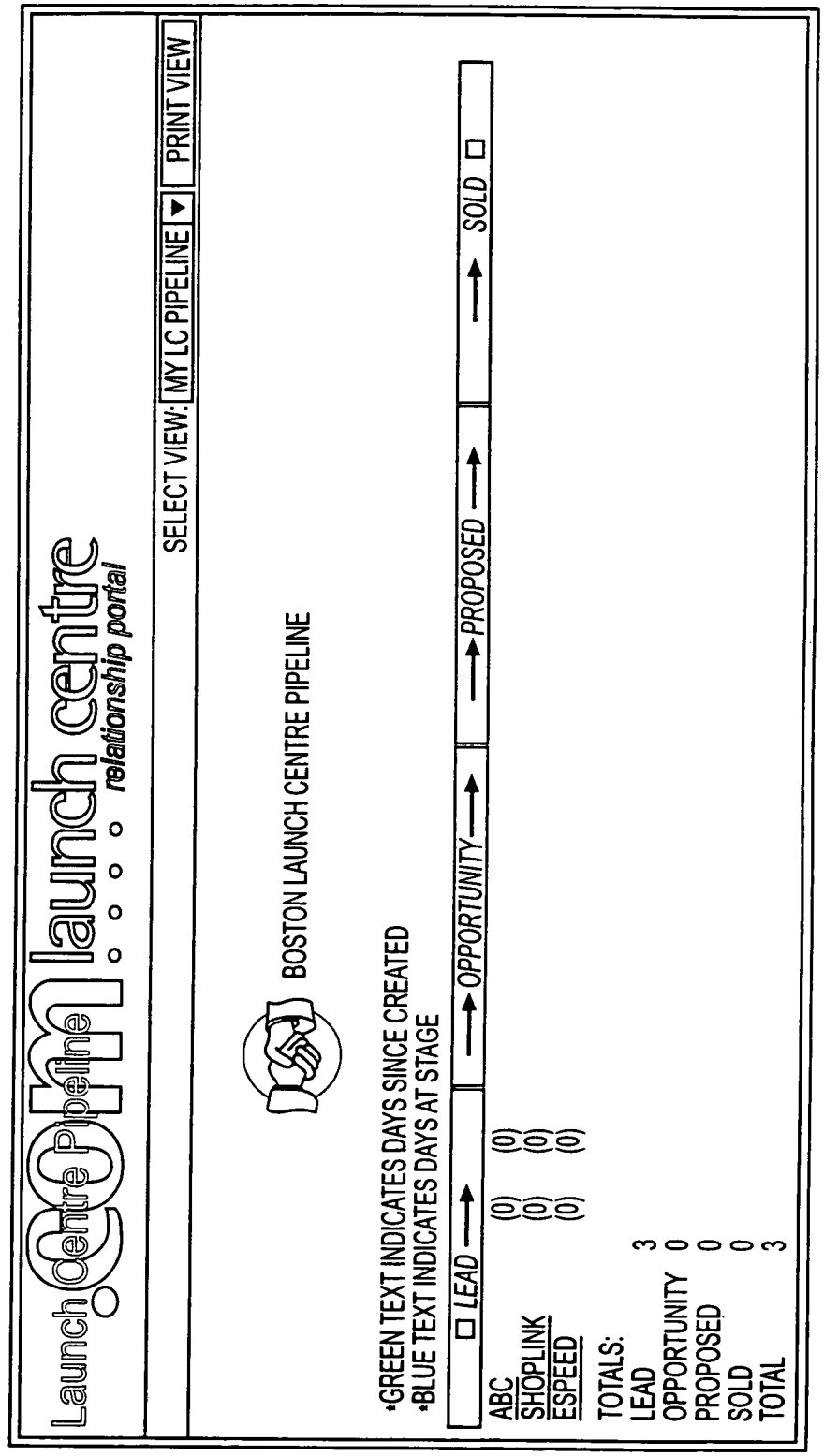
FIG. 13A illustrates a screen for viewing a launch center pipeline report.

FIG. 13A shows an illustrative example of the second type of report, "launch center pipeline," which provides a view similar to the "my pipeline" report, but at the launch center level. For a user in a launch center, the user will see a report for their launch center. For other users, this page can potentially be accessed by clicking on a launch center name on the pipeline summary report page shown in FIG. 13C. This pipeline summary page is the third type of pipeline report and preferably provides an overview of all launch centers and the quantities of opportunities at each stage level.

With reference to FIG. 13D, the launch center summary reports preferably provide a list of all non-dead opportunities in a selected launch center. The opportunity names preferably include embedded hyperlinks to the opportunity profile page for the respective opportunities.

Figure 13B:
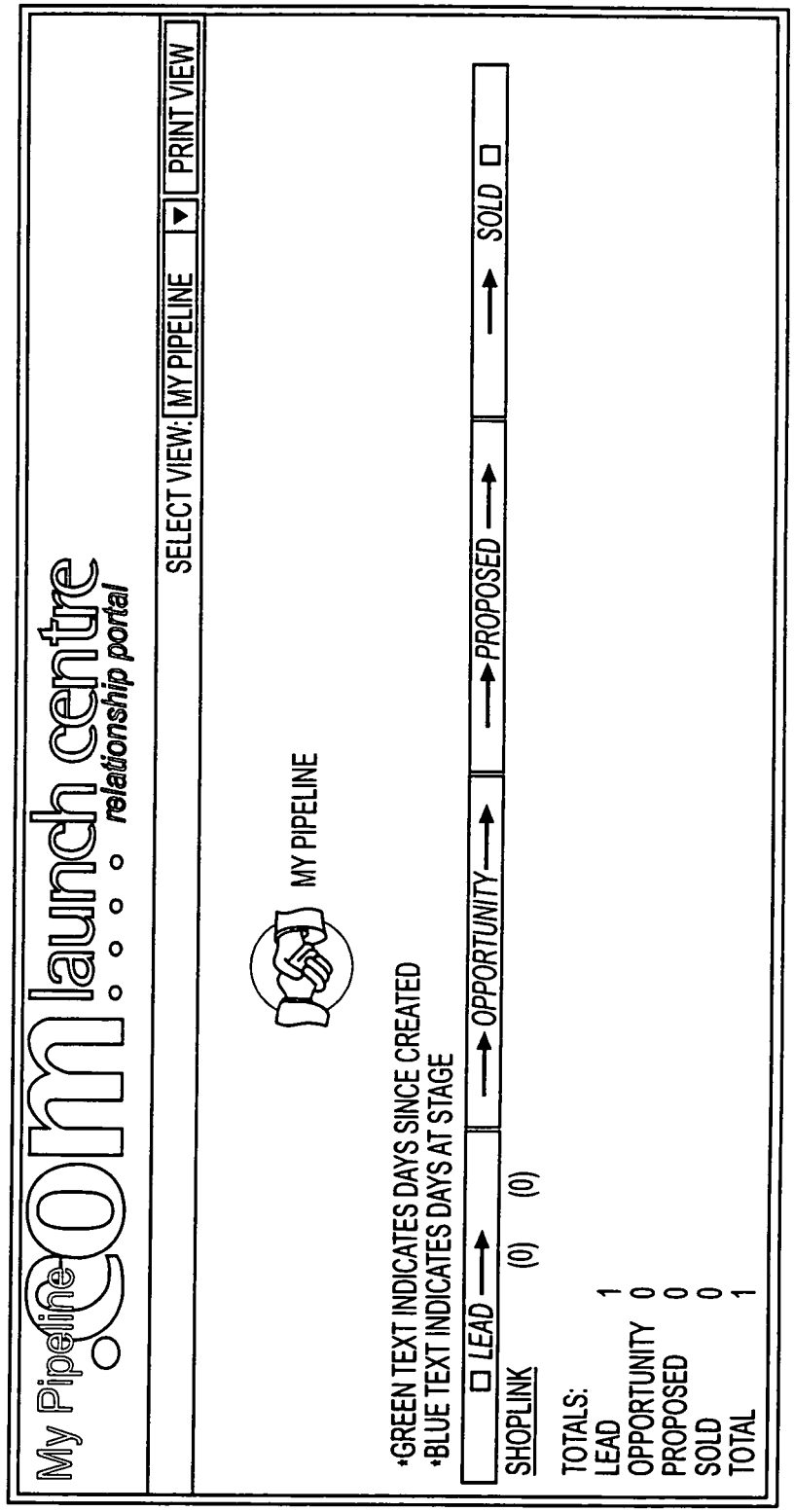
FIG. 13B illustrates a screen for viewing a "my pipeline" report.
Figure 13C:
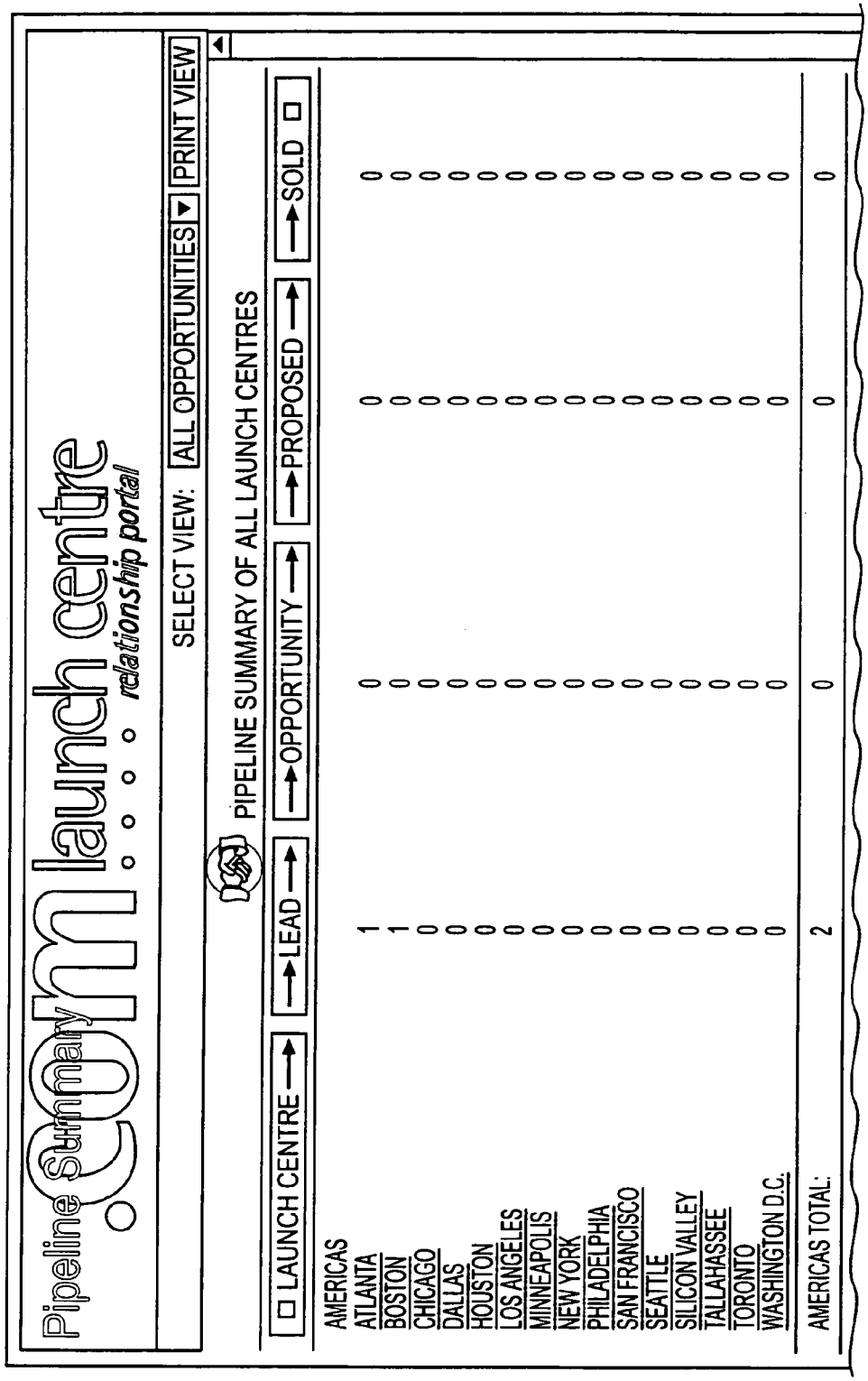
FIG. 13C illustrates a screen for viewing a pipeline summary report.
Figure 13E:
FIG. 13E illustrates a screen for viewing a global summary report.
Figure 13G:

With reference to FIG. 13E, global summary reports preferably provide a view of all launch centers, grouped by region, with information about opportunities that are either in the proposed or sold stages. The default view is preferably of all launch centers in all regions. Preferably, one can select a specific region through the drop down menu (e.g., such as in the illustrated example, on the top right hand portion of the page). The available views may include for example: global (FIG. 13E); Americas (FIG. 13F); Asia Pacific (FIG. 13G); and/or EMEIA (FIG. 13H).

Figure 6:
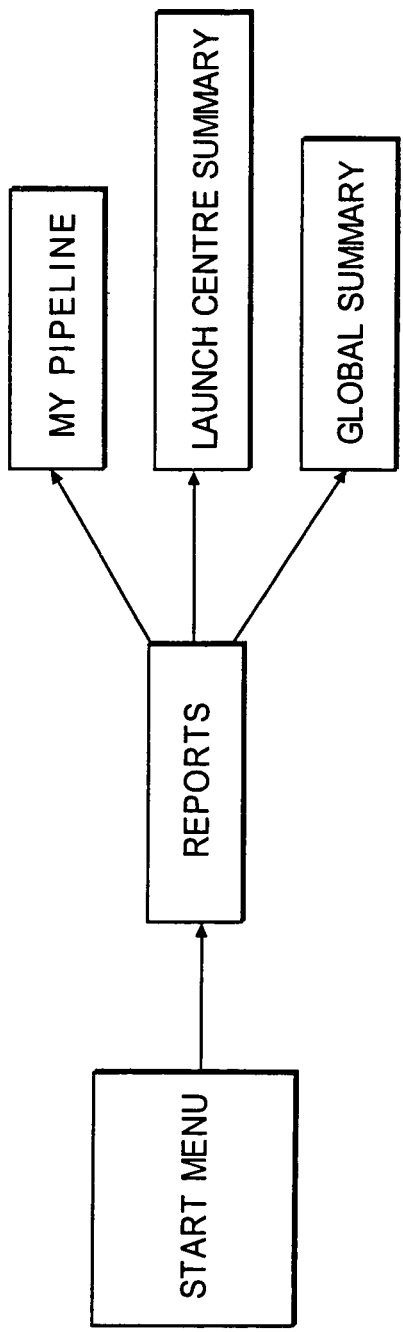
FIG. 6 illustrates navigation for the various categories of reports that can be carried out.

In some illustrative embodiments, navigation for the various categories of reports can be carried out as shown in FIG. 6. As shown, a user preferably clicks on a start menu, then clicks on reports under the start menu, and then selects the desired type of report (e.g., my pipeline, center summary or global summary). With respect to the "my pipeline" reports, an illustrative example is shown in FIG. 13B. Preferably, the "my pipeline" report will bring up all opportunities in the various pipeline stages for the user's launch center. In preferred embodiments, this report is only viewable by internal users (i.e., "my pipeline" reports are preferably not viewable by external users). Preferably, internal users will default to an launch center opportunity (LC opportunity) view and can choose a "my pipeline" view. There are preferably two pipeline permissions: a) view pipeline local and b) view pipeline global. Preferably, users with local permission will only be able to view their local launch center information and their launch center summary page. Preferably, users with global permission will be able to see across multiple (preferably all) launch centers on the "my pipeline" screen. In addition, users with global permission will preferably be able to view a global summary option on the start menu. Preferably, global users will default to an "all opportunities" view. In some preferred embodiments, launch center operation leads and partners will receive global permission by default. Preferably, an internal user who chooses "my pipeline" (e.g., in a drop-down menu) will be presented with all opportunities for which the user appears in the contacts page. In addition, an internal user who chooses "my LC pipeline" (e.g., as shown in FIG. 13A) will preferably be presented with all opportunities affiliated with the user's launch center. Preferably, a "printable view" button is provided (e.g., such as, for example, shown at the top of the page in FIG. 13A) to enable the user to capture the entire report into a new window session in order to print. Preferably, "lead," "opportunity," "proposed," and/or "sold" regions provide respective lists of all opportunities in the respective stages and calls the opportunity profile for the selected records.

With further reference to FIG. 13D, a "launch center summary" screen to preferably enables a user to quickly view summary opportunity information from different launch centers. Preferably, the table provides some basic information in reference to the opportunity as well as a hyperlink to the opportunity profile. Preferably, the "launch center summary" will bring up all opportunities as of the current date for the user's launch center. In preferred embodiments, the launch center summary will only include the opportunities from the owner's launch center. In some preferred embodiments, totals will appear for one or more, preferably all, of the following: projected net fees; projected cash margin; sweat equity; cash equity; and/or ownership value at IPO. Preferably, the opportunity column will provide links to the opportunity profile page for the individual opportunities listed. Moreover, a "print view" button can be provided to allow the user to capture the entire report into a new window session in order to print.

In preferred embodiments, no external users will be permissioned to view launch center summaries. Preferably, internal users will be able to view launch center summaries and internal users at the global level can see all launch center summaries, while those at the launch center level can only see their own launch center summaries.

With further reference to FIG. 13E, a "global summary" screen preferably enables a user to quickly view key financial indicators for all or a multitude of launch centers within the world. As discussed, the global summary page can be accessed, for example, from a start menu by clicking reports and global summary. Preferably, the user can then look at details for a particular launch center by clicking on the hyperlinked launch center name. Preferably, the global summary page will be viewable by users with global permission. Preferably, the report will bring up key financial indicators broken down for each launch center within the geographic regions. In some embodiments, at least some of the following financial indicators will be presented for each launch center: 1) proposed engagements: quantity; projected gross fee; and/or total AC investment; and 2) sold engagements: quantity; projected gross fee; and/or total AC investment.

Preferably, as shown, geographic totals will appear below for all columns. The name of the opportunity (e.g., Boston) will preferably provide a link to an individual launch center summary page. Moreover, a "print view" button can be provided to allow the user to capture the entire report into a new window session in order to print.

Opportunities:

In preferred embodiments, the opportunities application provides an environment where business partners can collaborate on the activities, such as, for example, involved in forming a business relationship with a consulting company or the like. In some preferred embodiments, an opportunity may include, for example, any e-business that is being evaluated by one of the launch centers.

In an illustrative example, to create an opportunity, some or all of the following steps are preferably conducted.

Figure 9F:
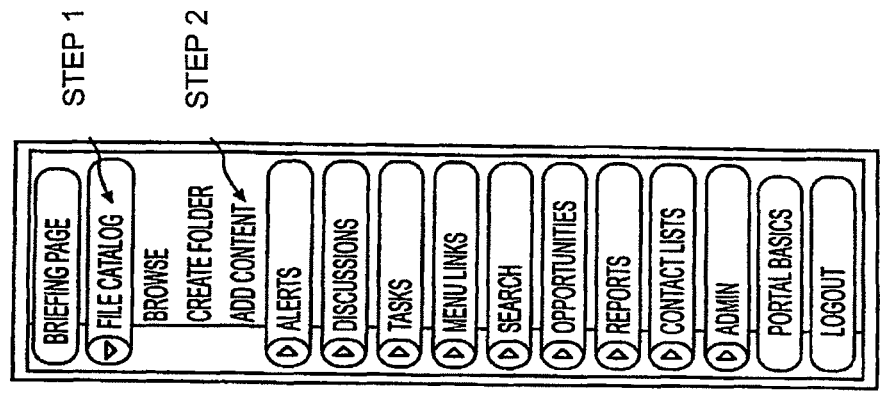
Figure 9E:
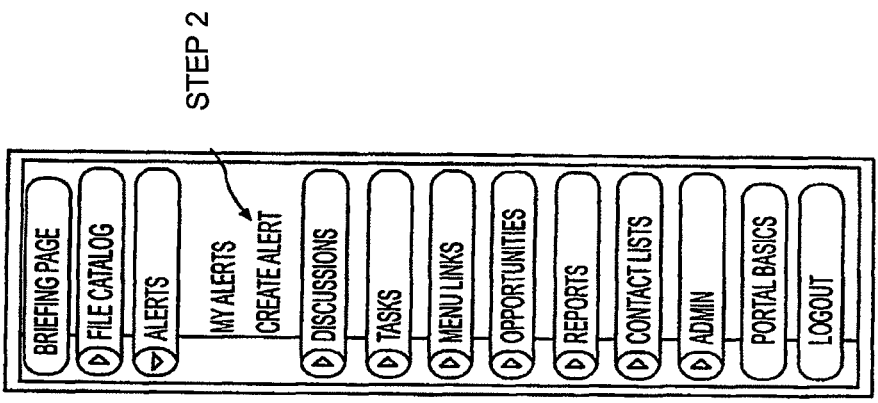
Figure 9D:
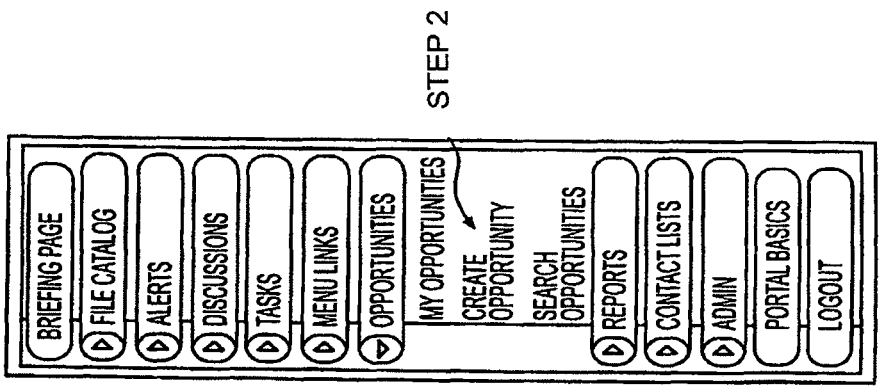

Step 1: As shown in FIG. 9D, a user may click on opportunities on the start menu.

Step 2: As shown in FIG. 9D, a user may click on the sub-menu item "create opportunity."

Step 3: As shown in FIG. 14A, a user may enter a company name.

Step 4: As shown in FIG. 14A, a user may select an opportunity owner by clicking on an "associate owner" button.

Figure 14B:
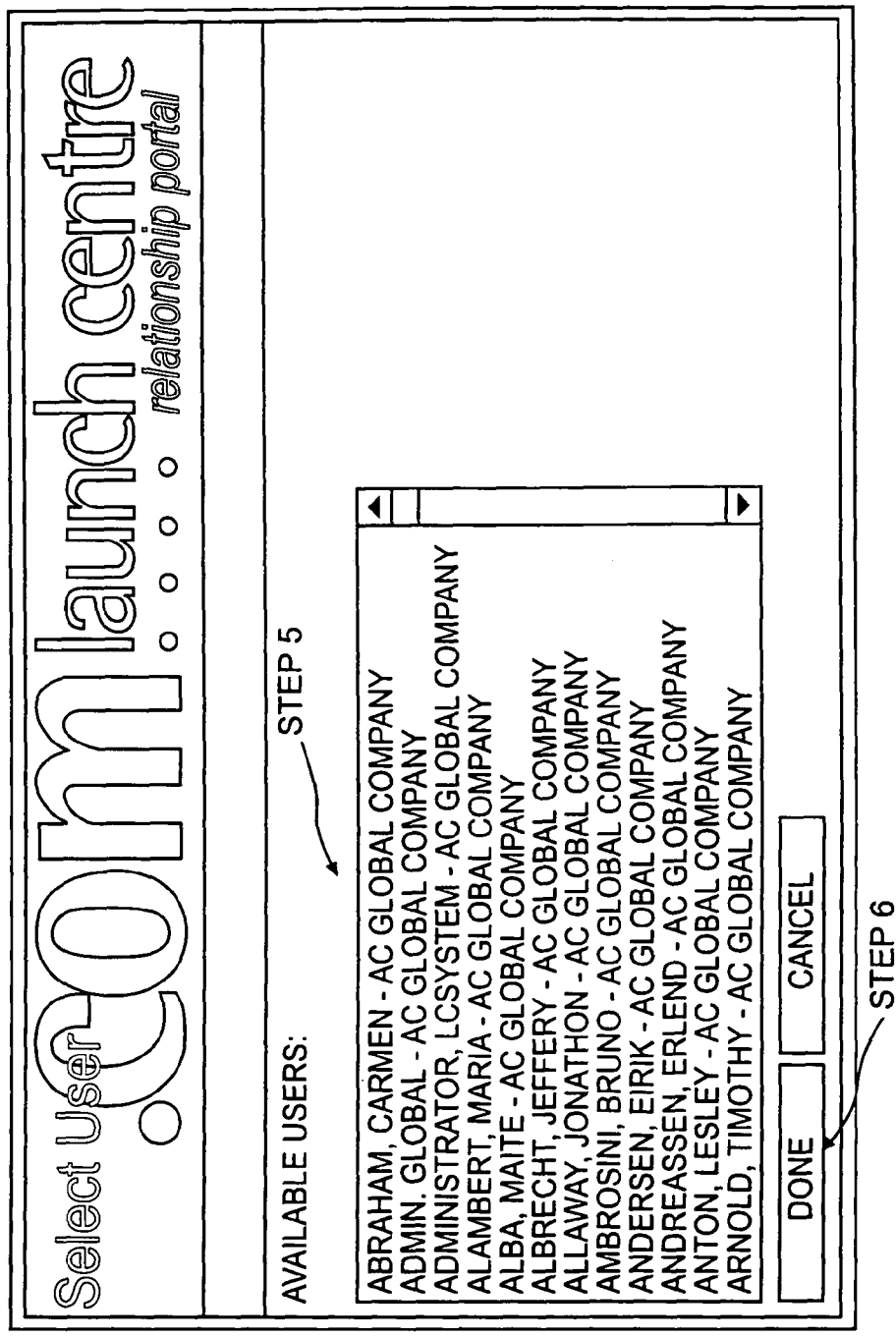

Step 5: As shown in FIG. 14B, a user may click on a user name.

Step 6: As shown in FIG. 14B, a user may click "done" to associate the selected user as opportunity owner.

Step 7: As shown in FIG. 14A, a user may enter a description for the opportunity.

Step 8: As shown in FIG. 14A, a user may click "done" to save the opportunity.

In some illustrative examples, options to view and search opportunities may include some or all of the following:

1. From a Briefing Page

Figure 14C:
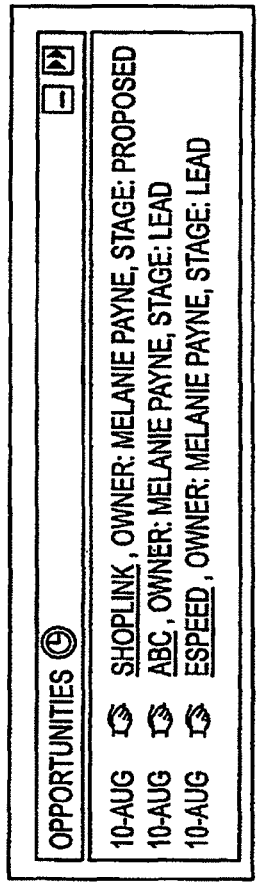
FIGS. 14C-14E illustrate screens for viewing an opportunity.

Choice 1: In the opportunities channel, a user may click on the opportunity title shown in FIG. 14C.

Figure 14D:
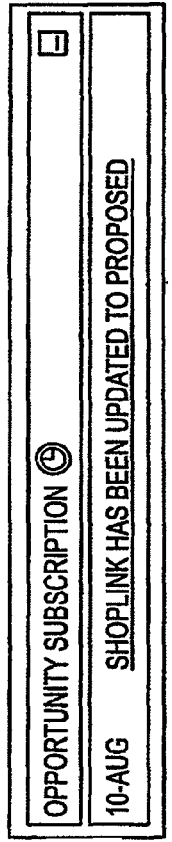

Choice 2: In the opportunities subscription channel, a user may click on the opportunity link shown in FIG. 14D.

2. From a Start Menu

Step 1: As shown in FIG. 9D, a user may click on "opportunities" on the start menu.

Step 2: As shown in FIG. 9D, a user may click on the sub-menu item "my opportunities."

Figure 14E:
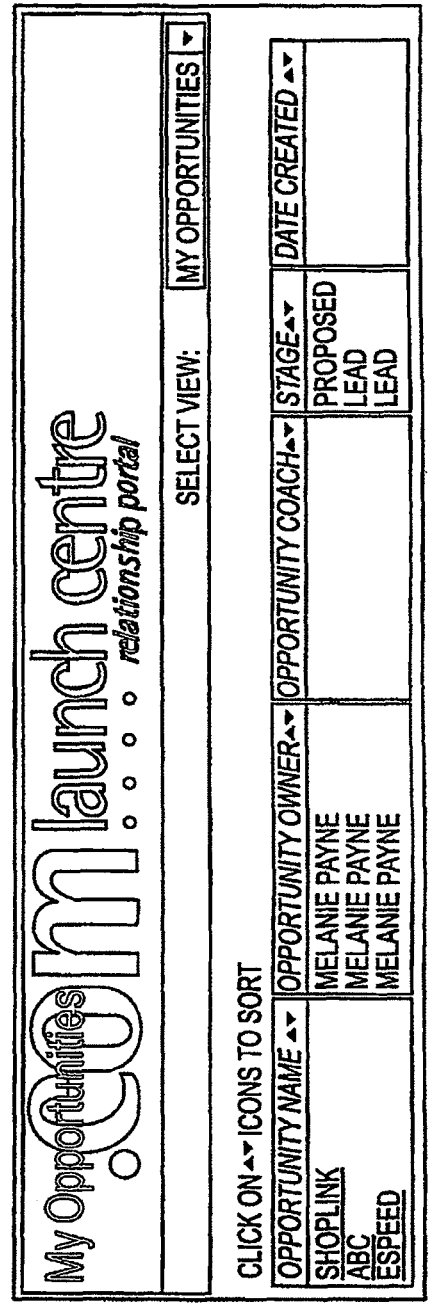

Step 3: As shown in FIG. 14E, a user may click on an opportunity name in a "my opportunities" screen.

3. From Search Opportunities

Step 1: As shown in FIG. 9D, a user preferably clicks "opportunities" on the start menu.

Step 2: As shown in FIG. 9D, a user preferably clicks the sub-menu item "search opportunities."

Figure 15A:
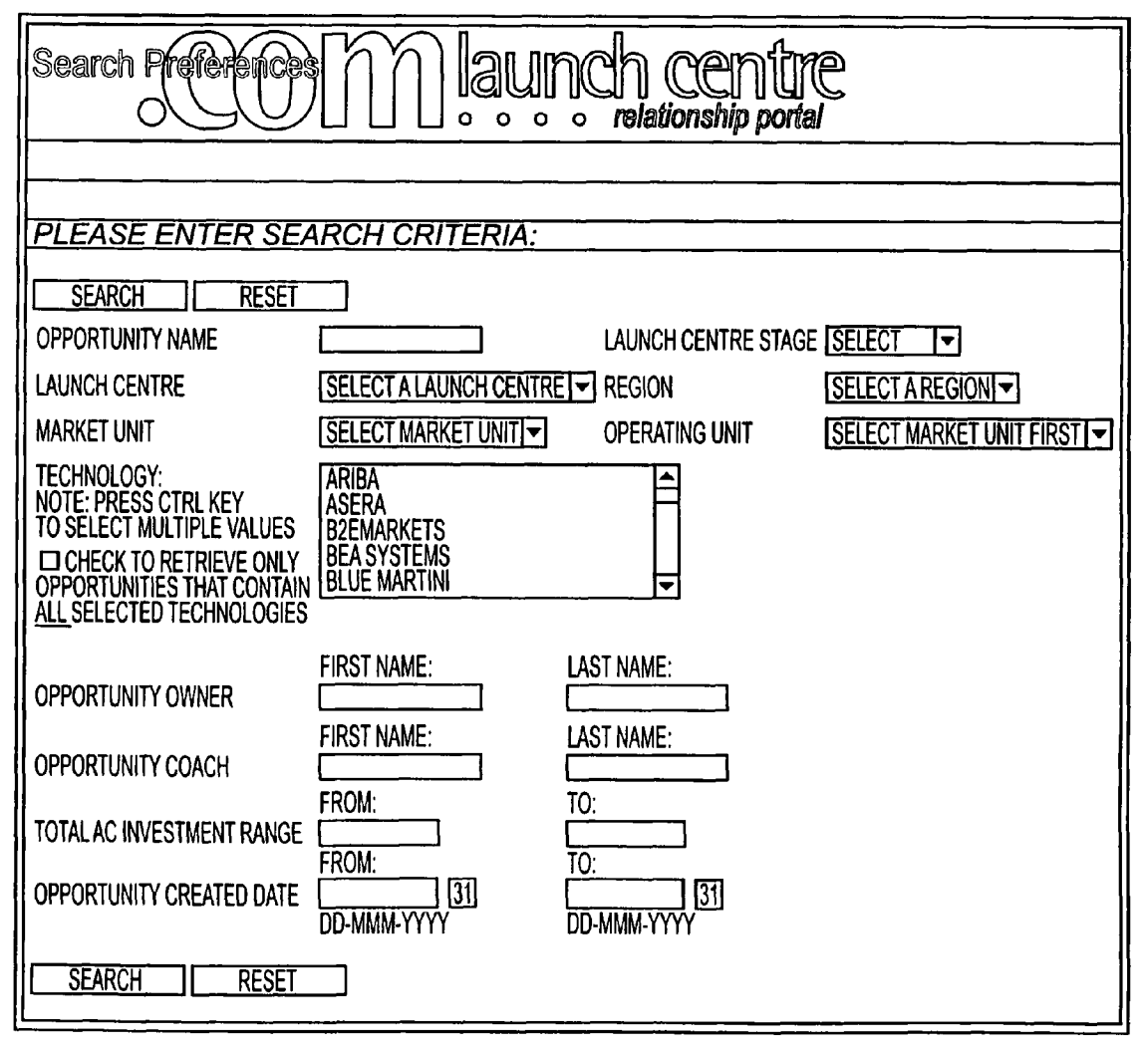

Step 3: As shown in FIG. 15A, a user preferably enters search criteria and clicks the "search" button.

Step 4: As shown in FIG. 15B, from the search results page, a user preferably clicks on the name of the opportunity the user wishes to view.

4. From the Reports Pages

Preferably, opportunities can be viewed from at least each of the foregoing three types of reports pages. From pages that display opportunities, a user preferably simply clicks on the opportunity name. For pages that display the launch centers, a user preferably clicks on the launch center name and then clicks on the chosen opportunity name on the next page. Preferably, after a user has gone through the procedures described above to view an opportunity, the user will be brought to an opportunity profile section. In preferred embodiments, this page may contain a number of tabs, each of which contains information relevant to the opportunity being viewed. Depending on the user's permission level for each particular opportunity, the user may or may not have edit rights on these tab sections. If the user does have edit rights and the user has made changes, the user preferably clicks the "save" button when finished updating the opportunity.

Figure 16A:
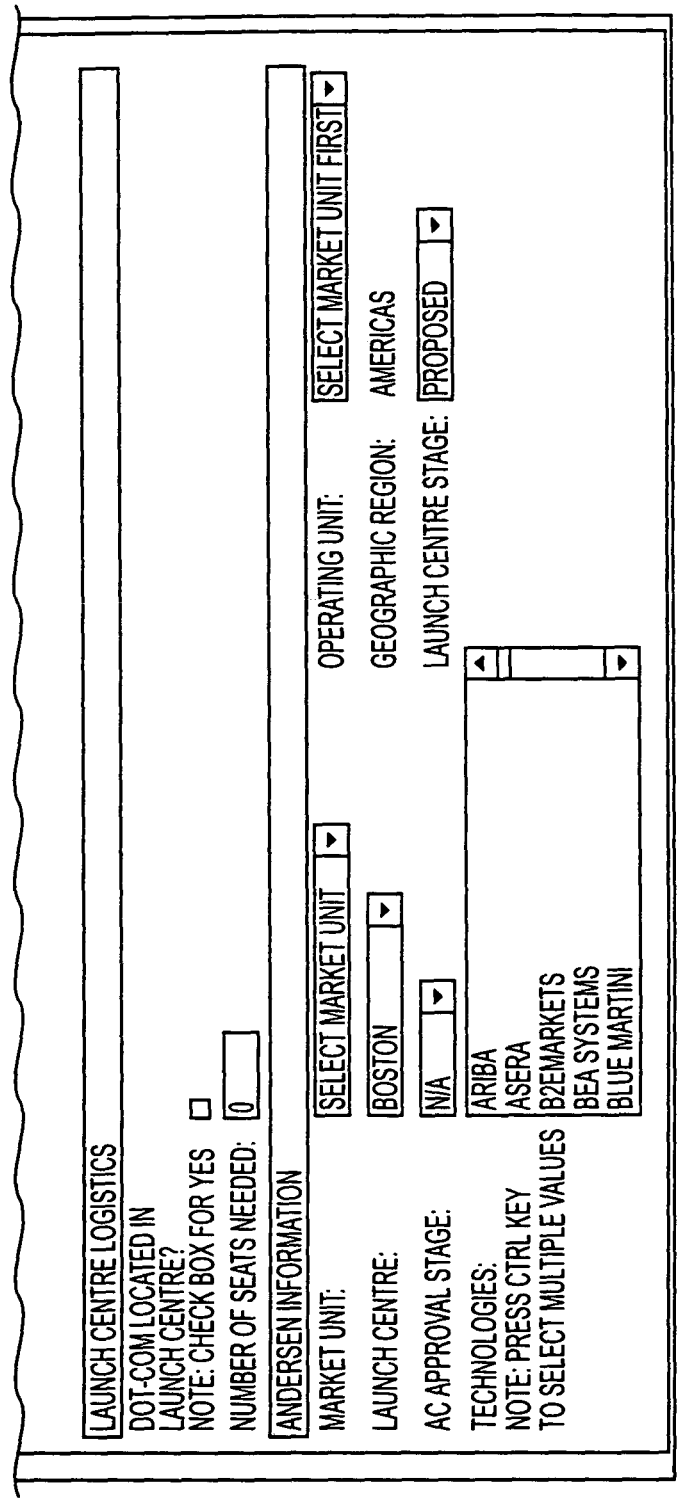
FIG. 16A illustrates a screen for a profile tab of an opportunity profile page.
Figure 16B:
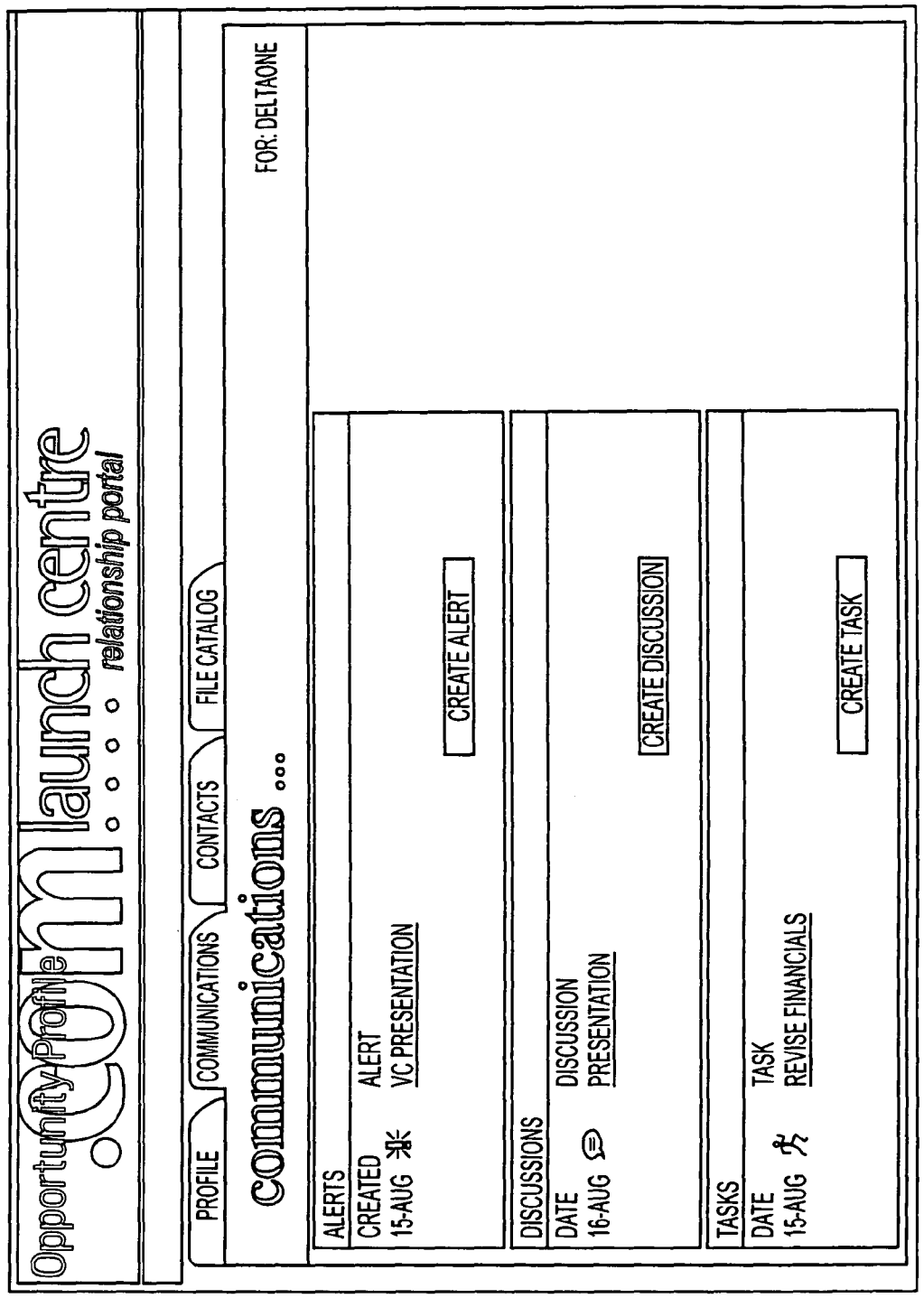
FIG. 16B illustrates a screen for a communications tab of an opportunity profile page.

In some preferred embodiments, a profile tab, such as shown in FIG. 16A, provides basic information regarding the opportunity. This preferably includes, for example, the address and phone number of the opportunity company. In preferred embodiments, there is also information regarding which market unit the opportunity falls under and the current evaluation stage of the opportunity.

In some preferred embodiments, a communications tab, such as shown in FIG. 16B, preferably allows a user to view and create alerts, discussions and/or tasks that are associated with the opportunity that the user is viewing.

In some preferred embodiments, a contacts tab, such as shown in FIG. 16C, preferably provides a listing of business partner companies and/or personnel that are a part of the team working on the particular opportunity. Preferably, a user can add new contacts from the list of associated companies by simply clicking the "select contact" button and then selecting the names of the people that the user wishes to add as contacts.

In some preferred embodiments, if their company is not currently associated with the opportunity, the user will first need to add it by clicking on the "select company" button and then selecting the company the user wishes to add.

Figure 16D:
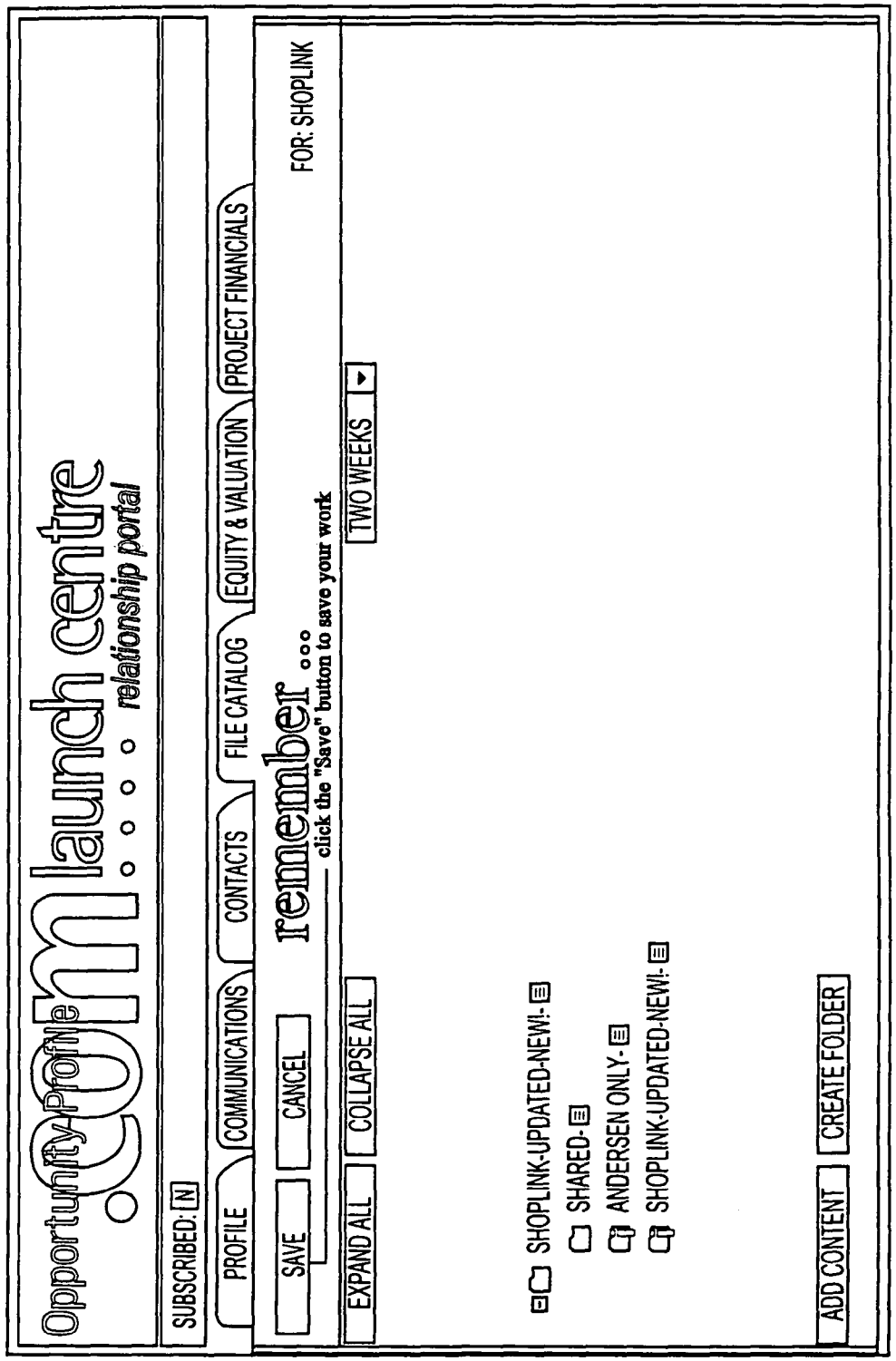
FIG. 16D illustrates a screen for a file catalog tab of an opportunity profile page.

In some preferred embodiments, a file catalog tab, such as shown in FIG. 16D, preferably provides a link to document storage folders that are specific to the opportunity. Preferably, some documents can be placed in a restricted folder and only that company and/or certain partners can view them. In addition, some documents can preferably be placed in a shared folder which may allow all of the business partners working on the opportunity to view the documents. Preferably, to add a document to one of the folders, a user clicks on an "add content" button and to add a new folder a user clicks on a "create folder" button.

Figure 16E:
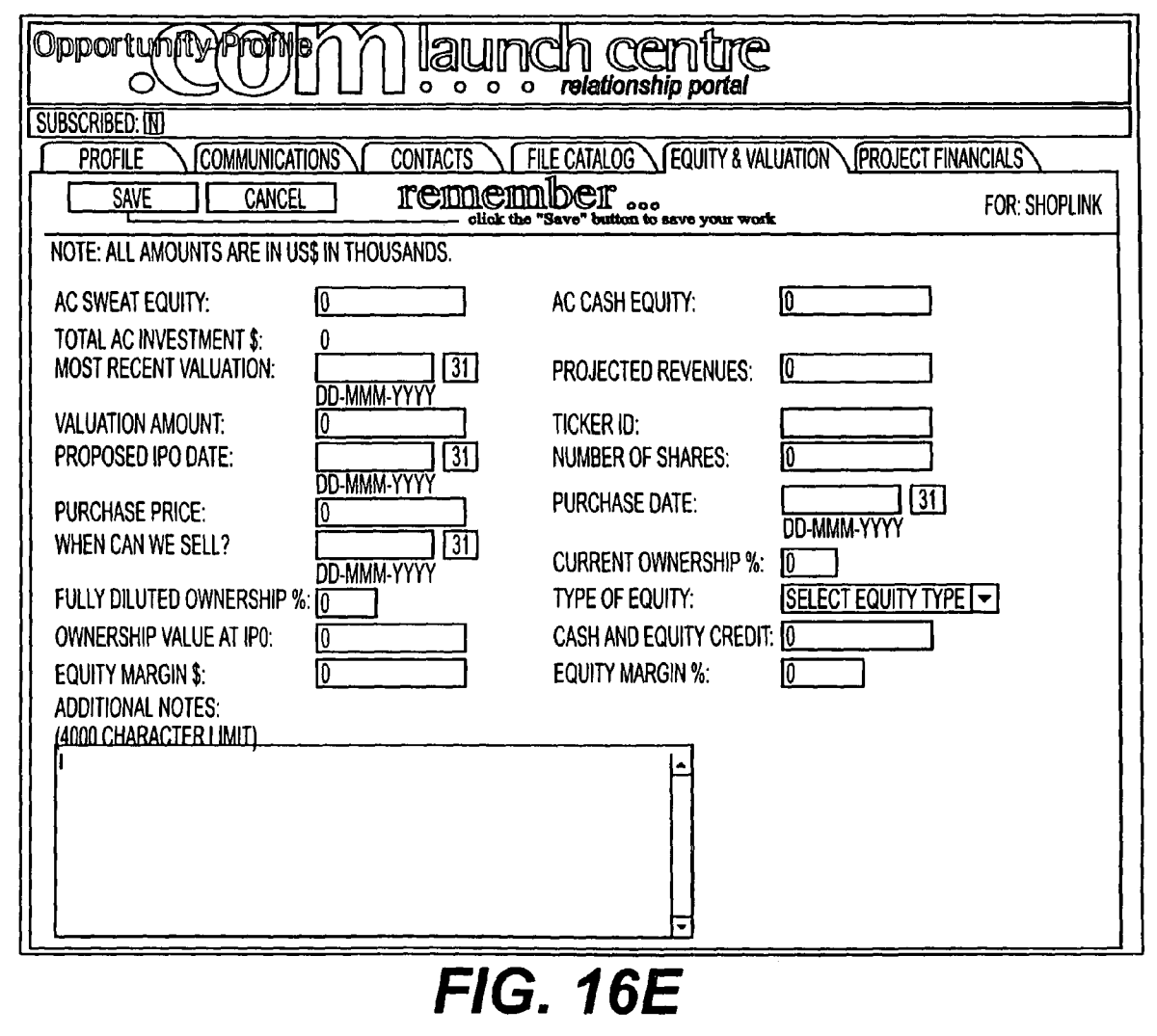
Figure 16F:
FIG. 16F illustrates a screen for a projects financials tab of an opportunity profile page.

In some preferred embodiments, an equity and valuation page is provided, such as shown in FIG. 16E, and/or a project financials page is provided, such as shown in FIG. 16F.

Preferably, an opportunity can be subscribed to in a number of ways. In preferred embodiments, opportunity subscriptions provide notifications when an opportunity has changed evaluation stages or the like. The notification preferably appears in the opportunity subscriptions channel of a respective user's briefing page.

In an illustrative example, a user can subscribe to an opportunity from the opportunity profile page as follows:
Step 1: As shown in FIG. 16A, 16C, 16D, 16E and/or 16F, the user may click on the icon in the upper left portion of the page to subscribe to an opportunity.

Preferably, an opportunity function enables portal users to capture, view and/or maintain information on opportunities. Preferably, depending upon permissions, users will be able to view and/or modify profile information, company background information and/or financial information for an opportunity. In some embodiments, the opportunity application will enable users to create, view and/or modify opportunities. Preferably, in some illustrative embodiments, opportunities have one or more of the following pipeline stages: lead; opportunity; proposed; sold; and/or dead.

Figure 3:
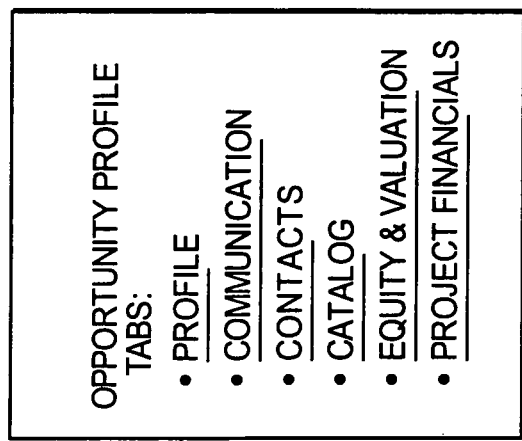
Figure 3:
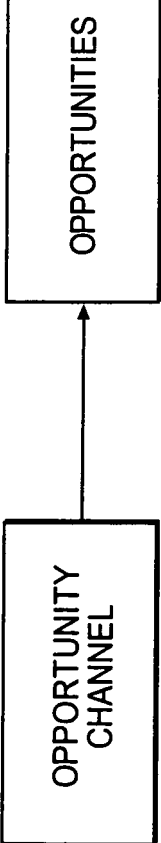
Figure 4:
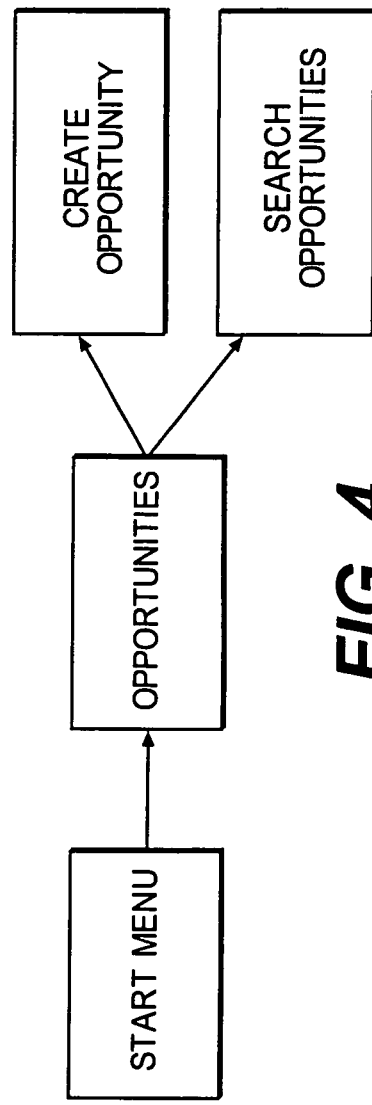

FIGS. 2, 3 and 4 illustrate user navigation for the opportunity functions according to some preferred embodiments. For example, as shown in FIGS. 2 and 3, an opportunity channel 112 accessible from a user's briefing page may include a link to a user's "opportunities" page, which includes links to opportunity profile pages for respective opportunities, which includes links to respective tabs, such as for example, profile, communication, contacts, catalog, equity and valuation and/or project financials tabs. As shown in FIG. 4, in some preferred embodiments, a user may create an opportunity by clicking on the start menu, then on "opportunities" and then on "create opportunity."

Preferably, the "create opportunity" screen enables the user to quickly enter a new opportunity into the system with minimal data entry. As discussed above, an illustrative form for submitting information is shown in FIG. 14A. Preferably, only users with a "create opportunity" permission will be able to access the "create opportunity" page. For example, this permission may be restricted to internal users (e.g., consultant company users) having user roles affiliated with a launch center or the like.

Preferably, creating an opportunity will also automatically place: (1) an opportunity owner; (2) a coach (e.g., a dot-com coach); and/or (3) a primary company contact (e.g., from the "create opportunity" screen) into the contacts list. Preferably, when a new opportunity is created, one or more, preferably all, of the following business objects are generated in the portal: opportunity profile; user profile; and/or company profile. The automatic creation of these business objects can provide a foundation for the permissioning functionality.

Preferably, upon clicking "done," a username is created and checked against existing usernames. If a duplicate exists, then preferably the new username will be appended by a number or the like. Preferably, a launch center location will default to the current user's geographic area. However, a user can preferably choose any launch center. Preferably, a "created by" field will default to the current user. In preferred embodiments, this information will carry over to the opportunity profile page and cannot be edited. The new opportunity will preferably be displayed in the opportunity channel of the owner and the launch center operation leads.

Preferably, the opportunity owner and launch center operation leads will be granted full management privileges over the opportunity. By default, users will preferably not have grant privileges, but they can be granted these privileges by the appropriate resource. Preferably, the client contact will be given "view" rights to the opportunity.

Preferably, if an opportunity name is not entered, the opportunity name will default to the company name. In some embodiments, a "send owner email notification" enables a user to send (or not send) an email to the opportunity owner. In some cases, this can be automatically deferred to e-mail notification (e.g., a check box may, for example, default to e-mail notification). Preferably, the opportunity owner is responsible for the maintenance and data integrity of opportunity data. Preferably, the "created by" user will not be given rights to the opportunity by default. Preferably, only the opportunity owner, the company contact and the launch center operation leads will be given default access to the opportunity.

With reference to FIGS. 2, 3 and 14E, a "my opportunities" screen is preferably provided that includes summary listings of opportunities. Preferably, only launch center personnel have access to this page. Preferably, at least one of the following two possible views are available for the screen.
1. My Opportunities—e.g., a list of opportunities for which the user is listed as a contact; and/or
2. My LC Opportunities—e.g., a list of opportunities associated with the user's launch center (LC).

In some preferred embodiments, view options will be driven by permissions and "my opportunities" will preferably default to "my LC opportunities" for all users except "global users." Global users will preferably default to a "my opportunities" view.

In the "my opportunities" screen shown in FIG. 14E, clicking on a hyperlinked opportunity name will preferably call an opportunity profile page for that record, and each opportunity in the opportunity column will preferably provide a link to individual opportunity profile pages.

As discussed above, an opportunity profile screen, such as shown in FIG. 16A, preferably displays both the company and the opportunity profile data. Preferably, this page is accessible to all users associated with an opportunity and only users with edit permission will be able to modify the data. In preferred embodiments, opportunity owners and operation leads will be the only initial users that will be able to edit this page. Preferably, to edit company profile data, a user must have company manager rights. The opportunity owner and LC operation leads will preferably be given company manager rights by default.

Preferably, the "approval stage" and "launch center stage" fields will not appear for external users and only permissioned users can change the stage of the opportunity. In preferred embodiments, other users will need to be permissioned individually. Preferably, partners and coaches associated with an opportunity will receive an alert when the stage is changed to "proposed." In preferred embodiments, when a new coach is added, an email will be sent to her account informing her that she has been added to an opportunity.

In preferred embodiments, the opportunity profile page shown in FIG. 16A may be accessed from one or more of the following pages:

1. A "my opportunities" page by clicking on a hyperlinked opportunity title;
2. A "briefing" page by clicking on a hyperlinked name in an opportunity channel;
3. A "briefing" page by clicking on a hyperlinked message in an opportunity subscriptions channel;
4. A "my pipeline" page by clicking on a hyperlinked opportunity title; and/or
5. A "launch center summary" page by clicking on a hyperlinked opportunity title.

Preferably, the "created by" and "date created" fields are read only. In addition, the "opportunity owner" field is preferably read only and is populated by user picking via the "associate owner" button that presents a list of appropriate personnel in the system. Moreover, the "coach" field is preferably read only and is populated by user picking via the "select coach" field that presents a list of appropriate personnel in the system. In preferred embodiments, the potential values of the launch center stage include: lead; opportunity; proposed; sold; and/or dead.

Preferably, all internal users can view this page across launch centers and all external users will not have opportunities appear as a start menu item. The opportunity channel will preferably be the only path for an external user to access opportunities via the portal. Preferably, external users on the contact list, by default, will have view access to this screen and internal users on the contact list will have default modify permission. Preferably, to edit company profile information, a user must have "company manager" permission. Opportunity owners and launch center operations leads will preferably have this permission by default and other users will need to be manually granted the permission in an administration function.

In preferred embodiments, all opportunities are assigned to a particular marketing unit. Marketing units may include, for example: communications and high technology marketing units; financial services marketing units; government marketing units; products marketing units; resources marketing units; etc. Preferably, all opportunities have a coach (e.g., a dot-com coach).

As discussed above, a communications tab, such as shown in FIG. 16B, preferably presents a single point of access for alerts, tasks and/or discussions related to an opportunity for an individual user. Preferably, the opportunity communications tab will display lists of the alerts, discussions and/or tasks that are associated with the opportunity. These lists can be similar to the ones displayed on a user's briefing page. Preferably, proximate each list will be a create button that will allow the user to create new alerts, discussions and/or tasks that are associated with the opportunity.

In preferred embodiments, only content related to the opportunity will be displayed and a user will only view information for which the user has permission. Preferably, alerts, tasks and/or discussions will not be retroactively permissioned for new contacts. All business objects generated from this page will preferably be automatically associated with the opportunity. Preferably, all business objects created outside the communications tab will not display on this page unless they are manually associated with the opportunity.

In preferred embodiments, the communications tab of the opportunity profile may be accessed from one or more of the following pages:

1. A "my opportunities" page by clicking on a hyperlinked opportunity title and then clicking on the communications tab;
2. A "briefing" page by clicking on a hyperlinked name in the opportunity channel and then clicking on the communications tab;
3. A "my pipeline" page by clicking on a hyperlinked opportunity title and then clicking on the communications tab; and/or
4. A "launch center summary" page by clicking on a hyperlinked opportunity title and then clicking on the communications tab.

Preferably, an "alert" field is hyperlinked so that clicking on the alert field displays a respective alert. Clicking on the "create alert" button preferably triggers create alert functionality. The "task" field is preferably hyperlinked so that clicking on the task field displays the respective task. Clicking on the "create task" field preferably triggers create task functionality. The "discussion" field is preferably hyperlinked so that clicking on the discussion field displays the respective discussion. Preferably, clicking on the "create discussion" field triggers create discussion functionality.

Preferably, the discussion, alerts and/or tasks applications may be used for ad-hoc notes, telephone logs, and more related to an opportunity. For example, if a user would like to maintain notes related to an opportunity, the user may create a discussion called "notes" and append entries. In addition, other users are preferably permissioned to see this discussion (e.g., notes) at the creator's discretion.

Preferably, a method will be implemented to gather associated object information in an application-appropriate manner for each application type, similar to the logic used in the briefing page channels for these applications. In one embodiment, for example, information gathered for each application type can be transformed into XMLNode objects (e.g., with attributes such as, for example, ApplicationID, Icon, URL, Name, and Date or the like) and appended to an XMLDocument which will be converted to text for return to an active server page (ASP). Preferably, the communications tab ASP can traverse the returned XML tree and break it up into appropriate HTML for the object lists on the page.

Preferably, for navigation and associations to the opportunity, the create alert, create discussion and/or create task pages may be modified in the following ways:

1. An XML object may be created and stored in a session variable to represent the current opportunity. Preferably, this is done when the communications tab is initially displayed. A name of the session variable may be passed to the create pages which will be modified to initialize their association list with the contents of this session variable. When the new object is saved, the existing core functionality preferably automatically creates the association to the opportunity.
2. The communications tab code preferably stores a URL in session variable which represents the path back to the communications tab for this opportunity. Preferably, another URL parameter will be used to inform the create pages that they must use this variable for done/cancel navigation rather than the default navigation to the briefing page.

As discussed above, a contacts screen, such as shown in FIG. 16C, preferably enables a user to quickly view contact information related to opportunities. A permissioned user may view, select and/or add contacts to an opportunity through this page. Preferably, to add a contact, the contact's company name should first be entered. Permissioning can be largely driven from the contact list. Preferably, the contact list also drives which opportunities appear for a user under "my opportunities."

Preferably, external users on the contact list will have view access to the contact tab, but external users will not be able to view other external users in the contact list unless administration creates a company-to-company relationship between the external companies. Preferably, internal users in the contact list will have "modify permission" by default. In preferred embodiments, only (1) operation leads, (2) coaches and/or (3) opportunity owners will be given the permission to add new users from the contact page.

Preferably, clicking on the "select company" button will allow a user to add a company to the contact list. The user preferably must select the contact's company before selecting the contact. Preferably, clicking on the select contact button allows a permissioned user to add a contact (e.g., either an internal or an external user) to the contact list for the opportunity. Preferably, external users can be added to the contacts list by permissioned internal users, but external users preferably cannot edit the contacts list themselves. In preferred embodiments, e-mail addresses in an e-mail column of contacts provides hyperlinks to send emails to the selected e-mail address.

In preferred embodiments, the contacts tab of the opportunity application may be accessed from one or more of the following pages:
1. A "my opportunities" page by clicking on a hyperlinked opportunity title and then clicking on the contacts tab;
2. A "briefing" page by clicking on a hyperlinked name in the opportunity channel and then clicking on the contacts tab;
3. A "my pipeline" page by clicking on a hyperlinked opportunity title and then clicking on the contacts tab; and/or
4. A "launch center summary" page by clicking on a hyperlinked opportunity title and then clicking on the contacts tab.

As discussed above, a "file catalog" screen, such as shown in FIG. 16D, preferably enables a user to quickly view and access content information related to an opportunity. Preferably, only content related to the selected opportunity will be displayed and users will only see categories and content that they are permissioned to see. In preferred embodiments, content will inherit the permissioning of the folder in which they reside.

Preferably, when the opportunity is first created, there will not be any catalog folders, but instead, the catalog tab will display a statement such as, for example, "click button to create the opportunity catalog" with a "create folder" button. Then, upon clicking the create folder button, default categories are preferably created. Default categories (e.g., folders) preferably include—one or more of the following: private; internal company; opportunity company; and/or any other company added as a contact to the opportunity.

Preferably, folders can be added manually by the opportunity owner, but he preferably also have to manage access to those new categories. In preferred embodiments, removing companies from an opportunity does not remove their folder. Preferably, internal company users will see and have access to all folders and the contents of those categories, except in the case of private folders where they will only see what they have permission to view. Preferably, a public folder is available for internal company users to place public cross-center content, such as templates, best practice content, etc. Preferably, only content related to the opportunity will be displayed. In preferred embodiments, the content will inherit the permission of the folder in which it is placed. Preferably, at least some of the catalog folders will be created automatically upon creation of the opportunity catalog or when adding a company to the contact list.

In preferred embodiments, the file catalog tab of the opportunity profile may be accessed from one or more of the following pages:
1. A "my opportunities" page by clicking on a hyperlinked opportunity title and then clicking on the file catalog tab;
2. A "briefing" page by clicking on a hyperlinked name in the opportunity channel and then clicking on the file catalog tab;
3. A "my pipeline" page by clicking on a hyperlinked opportunity title and then clicking on the file catalog tab; and/or
4. A "launch center summary" page by clicking on a hyperlinked opportunity title and then clicking on the file catalog tab.

Preferably, a "manage access" functionality is only viewable by internal company users. Manage access will preferably allow for manual permissioning.

As discussed above, an "equity and valuation" tab, such as shown in FIG. 16E, preferably enables a user to quickly view financial details related to an opportunity. For example, many of these fields may be used for internal reporting. Additionally, many of these fields may also be used for reports generated by the portal for global users. Preferably, only users with permission will be allowed to access the equity and valuation tab. In preferred embodiments, the equity and valuation tab of the opportunity profile may be accessed from one or more of the following pages:
1. A "my opportunities" page by clicking on a hyperlinked opportunity title and then clicking on the equity and valuation tab;
2. A "briefing" page by clicking on a hyperlinked name in the opportunity channel and then clicking on the equity and valuation tab;
3. A "my pipeline" page by clicking on a hyperlinked opportunity title and then clicking on the equity and valuation tab; and/or
4. A "launch center summary" page by clicking on a hyperlinked opportunity title and then clicking on the "equity and valuation tab."

Preferably, the type of equity region can be populated by, for example, at least some of the following values (e.g., via a drop down menu): common; preferred; and/or warrants. In preferred embodiments, by default, only internal users will be able to view this tab and only internal users in the contact list for the opportunity can edit this page. Preferably, external users will not be given access to this page and only internal users in the contacts list for the opportunity can edit this page. A user with access to this page will preferably also have access to the project financials page.

As discussed above, a project financials tab, such as shown in FIG. 16F, preferably enables a user to quickly view internal project financial details related to an opportunity. Preferably, key projected and actual financial indicators are listed in this tab and substantially all internal project numbers can be found on the financials tab, as well as additional notes to capture relevant information. Preferably, most of the data captured on the financial tab can be pulled into the various reports.

Preferably, only internal users with permission will be able to access the project financials tab and only internal users in the contact list for the opportunity can edit this page. Preferably, external users will not be given access to this page. A user with access to this page will preferably also have access to the equity and valuation tab.

In preferred embodiments, the project financials tab of the opportunity application may be accessed from one or more of the following pages:
1. A "my opportunities" page by clicking on a hyperlinked opportunity title and then clicking on the project financials tab;
2. A "briefing" page by clicking on a hyperlinked name in the opportunity channel and then clicking on the project financials tab;
3. A "my pipeline" page by clicking on a hyperlinked opportunity title and then clicking on the project financials tab; and/or
4. A "launch center summary" page by clicking on a hyperlinked opportunity title and then clicking on the project financials tab.

As discussed above, a search screen, such as shown in FIG. 15A, preferably enables a user to quickly search for opportunities across launch centers based on a variety of criteria. Preferably, only users with permission will be able to access the search opportunities page and no external users will be permissioned to view the search capability. The search opportunities preferably gives the user the ability to enter in search criteria. The user can preferably search by any or all of the entered criteria. The opportunity search will preferably bring back opportunities according to the search criteria chosen on the search page. Preferably, at least some or all of following information will be displayed in the search results: company; owner; coach; stage; date created; launch center; market and operating unit; and/or total investment.

Preferably, a hyperlink will exist for all opportunities brought back from the search that will lead to the opportunity profile page. As shown in FIG. 15B, a search results screen can be provided that displays the results from the search criteria entered on the opportunity search page. The search results page may, for example, be accessed by clicking a "search" button on the opportunity search page shown in FIG. 15A. Preferably, only internal users with permission will be able to access the opportunity search results page and no external user will be able to view search results. The user will preferably be able to link back to the opportunity profile page for each individual opportunity. All fields entered as criteria on the opportunity search page preferably appear at the top of the opportunity search results page. Preferably, a user is able to navigate with "back" and "next" links on the results page in order to see all returned opportunities. In preferred embodiments, a "print view" button at top of page will allow the user to capture the entire report into a new window session in order to print.

In an illustrative example, an opportunity application preferably includes: a) a custom application class, providing a start menu section and briefing page channel; b) a set of pages for creating and editing opportunity objects, and for associating opportunities to catalog content, discussions, alerts and/or tasks; c) a set of Java classes for supporting these pages; and d) a set of database tables for storing opportunity information (e.g., such as, for example, including: an opportunity table to store core information displayed in an opportunity profile tab; an equity valuation table to store equity and valuation information displayed in an equity and valuation tab associated with an opportunity [e.g., one record per opportunity]; a project financials table to store project financial information displayed in a project financials tab; a companies selected table to store companies that have been selected for the opportunity and that appear in the contacts tab [e.g., one or more record per opportunity]; a contacts selected table to store contacts that have been selected for the opportunity and that appear in the contacts tab [e.g., one or more record per opportunity]).

Figure 5:
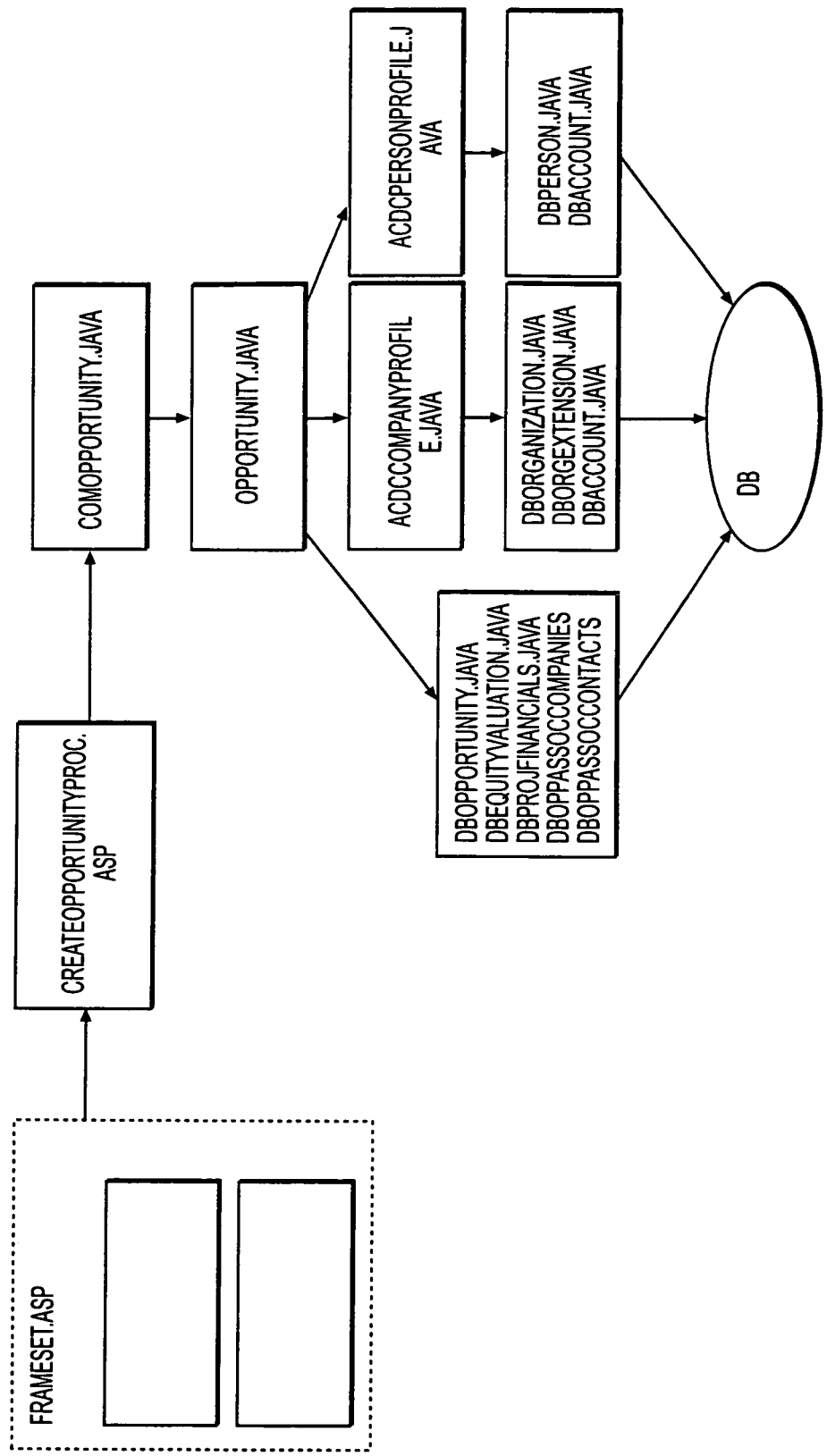
FIG. 5 shows illustrative modules that may be used in the creation of an opportunity in some embodiments.

FIG. 5 shows illustrative modules that may be used in the creation of an opportunity in some illustrative and non-limiting embodiments. A Frameset.asp module can be used, for example, to display a header and a create opportunity form. A method in ComOpportunity can preferably obtain a list of all companies and/or launch centers that the user's company has a relationship with. Preferably, the CreateOpportunityProc.asp module will enter all information into a recordset that is then passed to the Opportunity.java module via a ComOpportunity.java passthrough module. In an illustrative and non-limiting example, the Java code in ComOpportunity.java and Opportunity.java may perform some of the following actions:
a) provide a single recordset that mirrors the fields in the CreateOpportunity form (e.g., this recordset can be used by the processing form to fill in the data and provide it to the CreateOpportunity method); b) verify that the user has a create opportunity permission (e.g., a redundant security check); c) create an opportunity record with initial data from the creation recordset; d) create empty equity valuation and project financials records; e) create company records; f) create an initial company contact record; g) create records for companies that have been selected for the opportunity; h) create records for companies that have been selected for the opportunity (e.g., for LC owner and company contact); h) setup the following permissions for the opportunity: i) view all opportunities to an all internal employees group; ii) manage all opportunities to a selected operations leads group and/or a system administration group; iii) manage opportunity to an opportunity owner; iv) view opportunity to an initial company contact.

Alerts:

Preferably, alerts allow users to send their business partners brief messages that require timely attention and/or action. Alerts can help manage the real-time processes that occur around business content. Alerts preferably enable users to target individual users or groups so that the right people receive the right information at the right time. In one illustrative example, an alert to a business partner alone holds value, but when that alert is associated to file catalog content items within the portal, the communication process becomes even more efficient and more valuable.

In an illustrative embodiment, to create an alert, a user may perform some or all of the following steps:
Step 1: As shown in FIG. 9E, the user may click "alerts" on the start menu (or, as shown in FIG. 16B, from the opportunity profile, the user may click on the "create alert" button on the communications tab).
Step 2: As shown in FIG. 9E, the user may click the sub-menu item "create alert."
Step 3: As shown in FIG. 17A, the user may select users or groups by clicking on the "select users" or "select groups" buttons.
Step 4: As shown in FIG. 11, the user may click on user name(s).
Step 5: As shown in FIG. 11, the user may click "add selected."
Step 6: As shown in FIG. 11, the user may click "done" to add users.
Step 7: As shown in FIG. 17A, the user may enter a "subject" (e.g., which will appear in the channel).
Step 8: As shown in FIG. 17A, the user may enter alert details (e.g., a message to be displayed).

Step 9: As shown in FIG. 17A, the user may add an association by selecting an object in the drop down menu and clicking "go."

Step 10: As shown in FIG. 17A, the user may click "done" to send the alert.

In some illustrative embodiments, alerts can be viewed in one or more of the following three ways.

1. From a Communications Tab of an Opportunity Profile

Step 1: As shown in FIG. 16B, a user may click on the alert title.

2. From an Alerts Channel on a Briefing Page

Figure 17B:
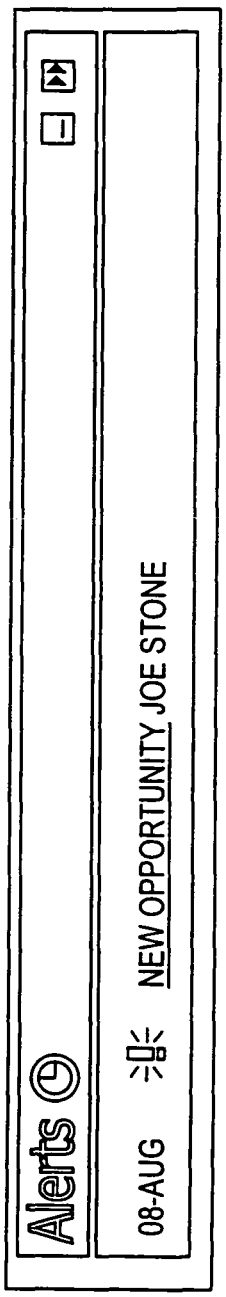
FIGS. 17B and 17C illustrate screens for viewing an alert.

Step 1: As shown in FIG. 17B, a user may click on the alert title.

3. From a Start Menu

Step 1: As shown in FIG. 9E, a user may click on the start menu.

Step 2: As shown in FIG. 9E, the user may click the sub-menu item "my alerts."

Figure 17C:
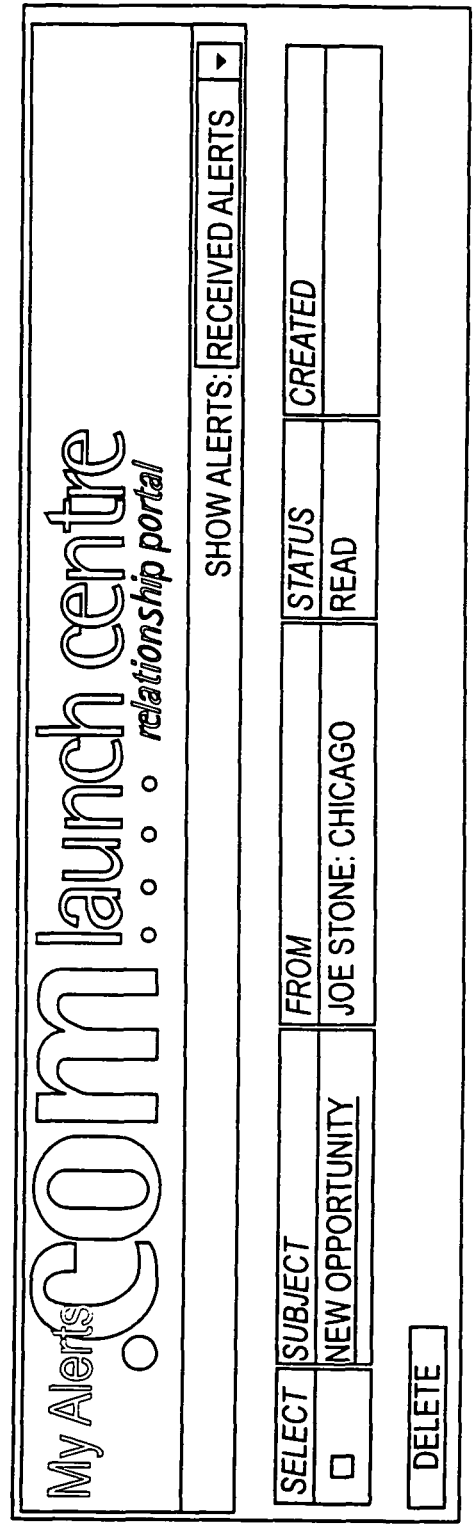

Step 3: As shown in FIG. 17C, the user may click on an alert title.

Figure 17D:
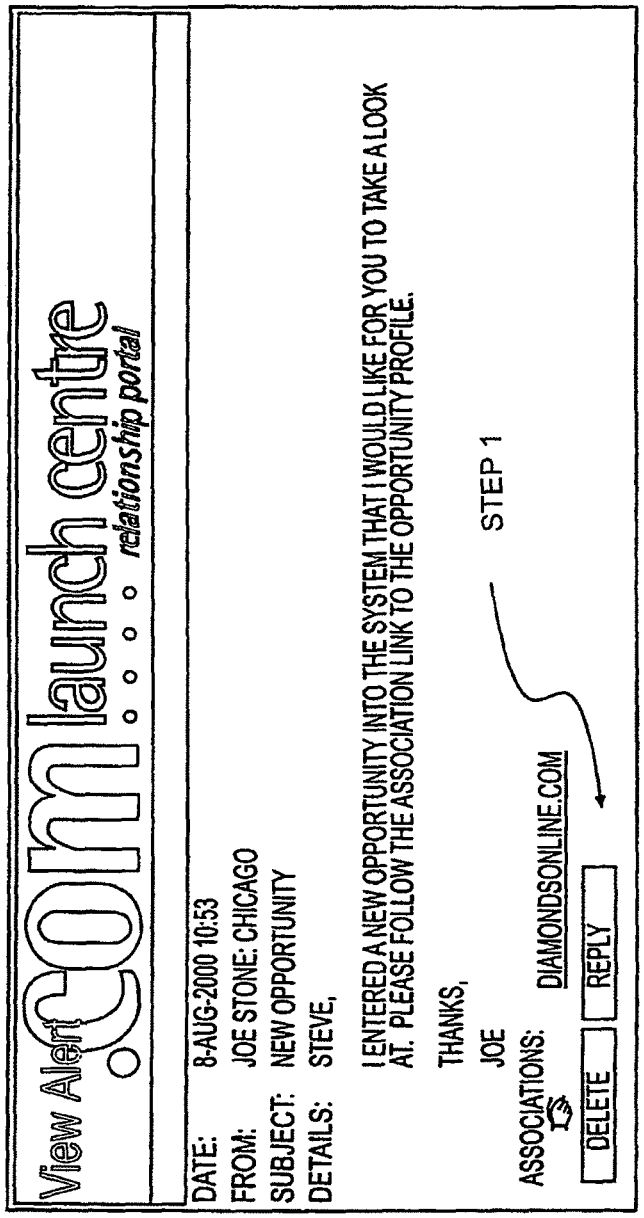
FIG. 17D illustrates a screen for replying to an alert.

Preferably, in order to reply to an alert, at least some of the following steps can be performed:

Step 1: As shown in FIG. 17D, while on the view alert page, the user may click "reply."

Step 2: As shown in FIG. 17A, as with creating an alert, the user may select the users and groups to send the reply to.

Step 3: With reference to FIG. 17A, the user preferably may either reuse the existing subject or enter a new subject.

Step 4: As shown in FIG. 17A, the user may add any comments in the details section.

Step 5: As shown in FIG. 17A, the user may select any other associations.

Step 6: As shown in FIG. 17A, the user may click the "done" button.

File Catalog:

Preferably, a file catalog provides a secure document repository where information can be shared among business partners. In some preferred embodiments, there are two forms of catalogs—e.g., a main file catalog which can be reached via the start menu and an opportunity file catalog which is a tab on the opportunity profile page. In preferred embodiments, documents in the main file catalog can be shared across opportunities and do not necessarily need to be associated with an opportunity, while the opportunity file catalog documents are specific to an opportunity and can only be viewed by individuals listed as contacts on that opportunity.

Preferably, with both the main file catalog and the opportunity file catalog, the user must also be granted permission to view the folder and the document. While the illustrative examples set forth below are for the main file catalog, the steps for the opportunity file catalog can be generally similar (e.g., except that the "add content" and "create folder" functions are preferably accessed through the buttons at the bottom of the page as shown in FIG. 16D).

In some illustrative embodiments, content can be added using at least some of the following steps:

Step 1: With reference to FIG. 9F, a user may click file catalog from the start menu (or, from the opportunity profile, a user may click on the "add content" button under the file catalog tab as shown in FIG. 16D).

Step 2: With reference to FIG. 9F, a user may click the sub-menu item "add content."

Step 3: With reference to FIG. 18A, the user may enter a title.

Step 4: With reference to FIG. 18A, the user may click the "add" button under the select folder section.

Step 5: With reference to FIG. 18B, the user may click the check boxes next to folder names to select target folders.

Step 6: With reference to FIG. 18B, the user may click the "done" button to save the user's selections.

Step 7: With reference to FIG. 18A, the user may click the "attach" button under the attach file or URL section.

Figure 18C:
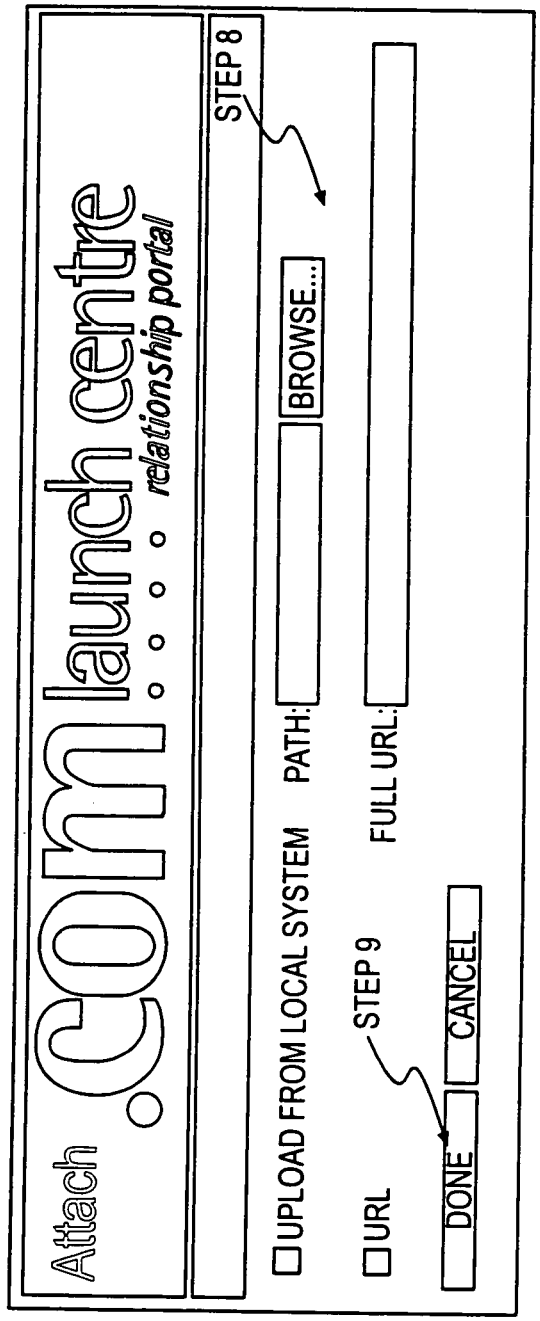

Step 8: With reference to FIG. 18C, the user may upload or enter the URL of the content under the attach file or URL section.

Step 9: With reference to FIG. 18C, the user may click the "done" button to save the user's selection.

Step 10: With reference to FIG. 18A, to associate an item, a user may select an item type from a drop down list and click the "go" button.

Step 11: With reference to FIG. 18A, the user may click on the "next" button to save the user's settings.

Figure 18D:
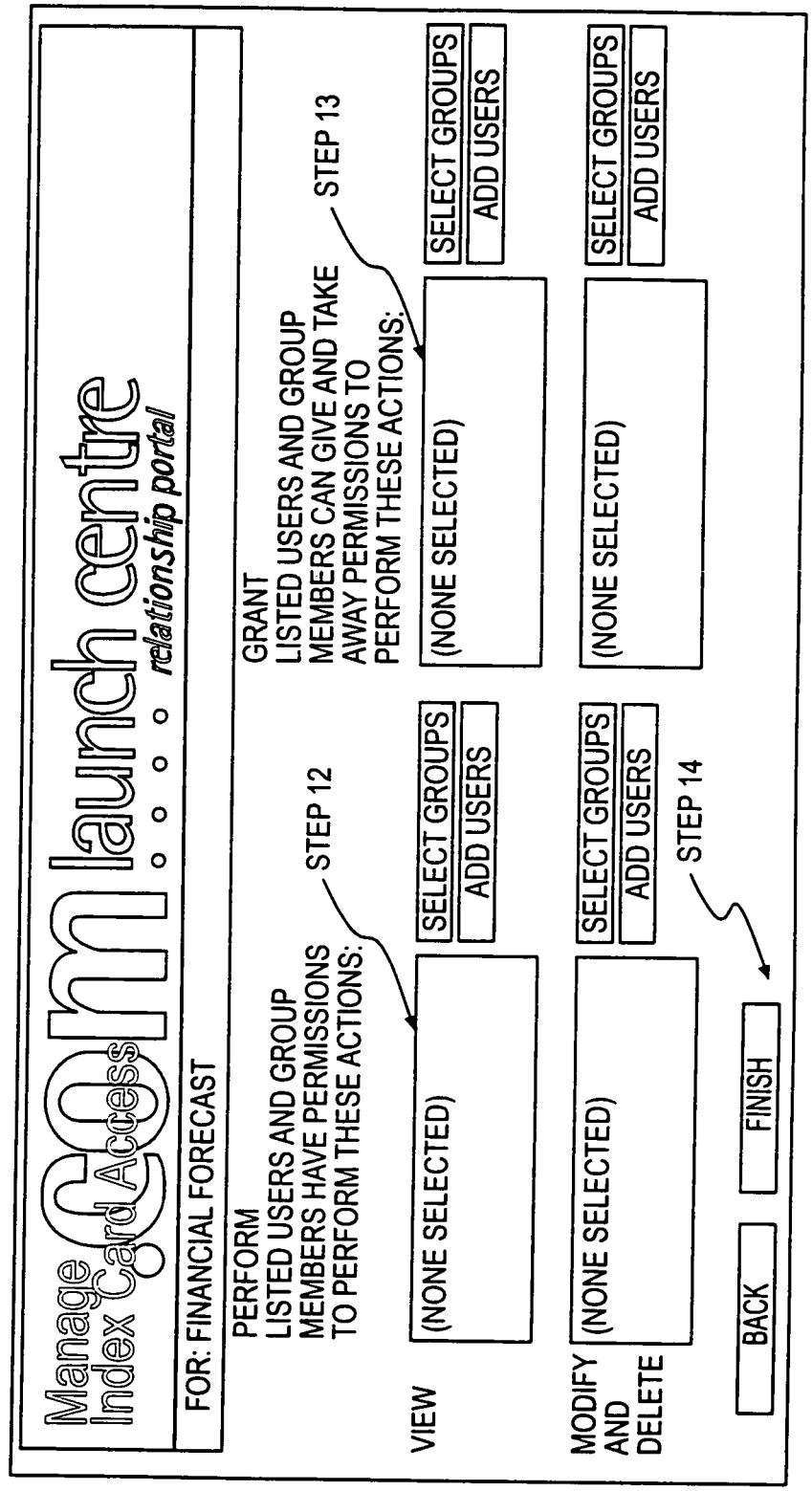
FIG. 18D illustrates a screen for establishing permissions for content of an opportunity.

Step 12: With reference to FIG. 18D, the user preferably selects groups and/or users that have perform access for either "view" or "modify and delete."

Step 13: With reference to FIG. 18D, the user preferably selects groups and/or users that have grant access for either "view" or "modify and delete."

Step 14: With reference to FIG. 18D, the user preferably clicks on the "finish" button to save the user's settings.

In preferred embodiments, specific permissioning for content is established. In brief, content permissions allow portal users to view and share documents. In some preferred embodiments, there are four types of content permission levels for controlling access to catalog content.

1. Perform View Access

Preferably, with reference to FIG. 18D, this level of permission allows a portal user to view, but not modify, a document or index card. Preferably, this does not give the user the ability to share the document with others.

2. Perform Modify/Delete Access

Preferably, with reference to FIG. 18D, this level of permission allows the portal user to view, modify and make changes to, both the document and index card. However, this preferably does not give the user the ability to share the document with others.

3. Grant View Access

With reference to FIG. 18D, this level of permission preferably allows the portal user to give "Perform View Access" permission to others. In other words, it preferably gives the user the ability to share the document, without giving others the ability to change the content.

4. Grant Modify/Delete Access

With reference to FIG. 18D, this level of permission preferably allows the portal user to give "Perform Modify/Delete Access" permission to others. In other words, it gives the user the ability to share the document and to allow others to make changes to the content.

In preferred embodiments: a) to view content, a portal user must have some type of perform permission for all parent folders to that content; b) to add content to a folder, a portal user must have Perform Categorize Access to the intended folder, as well as, all parent folders; and/or c) to share content, a portal user must grant Perform View Access to the content. Preferably, the user should also grant Perform View Access (or verify that it is already in place) to all parent folders to the users with whom the content is to be shared. In preferred embodiments, grant permission alone is not enough, and a portal user will not be able to see a folder or content item in the catalog with grant permission alone.

Creating a New Folder:

In an illustrative preferred embodiment, a user creates a new folder using some or all of the following steps.

Step 1: With reference to FIG. 9F, a user preferably clicks file catalog on the start menu (or, from the opportunity profile, the user may click on the "create folder" button under the file catalog tab shown in FIG. 16D).

Step 2: With reference to FIG. 9F, the user preferably clicks the sub-menu item "create folder."

Step 3: With reference to FIG. 18E, the user may enter a folder name.

Step 4: With reference to FIG. 18E, the user may click the "select" button to assign a parent folder.

Step 5: With reference to FIG. 18B, the user may click the selector next to the desired parent folder.

Step 6: With reference to FIG. 18B, the user may click the "done" button to save the user's selection.

Step 7: With reference to FIG. 18E, the user may click the "add" button to place existing content into this new folder.

Step 8: With reference to FIG. 18E, the user may click on the "next" button to save the user's settings.

Figure 18F:
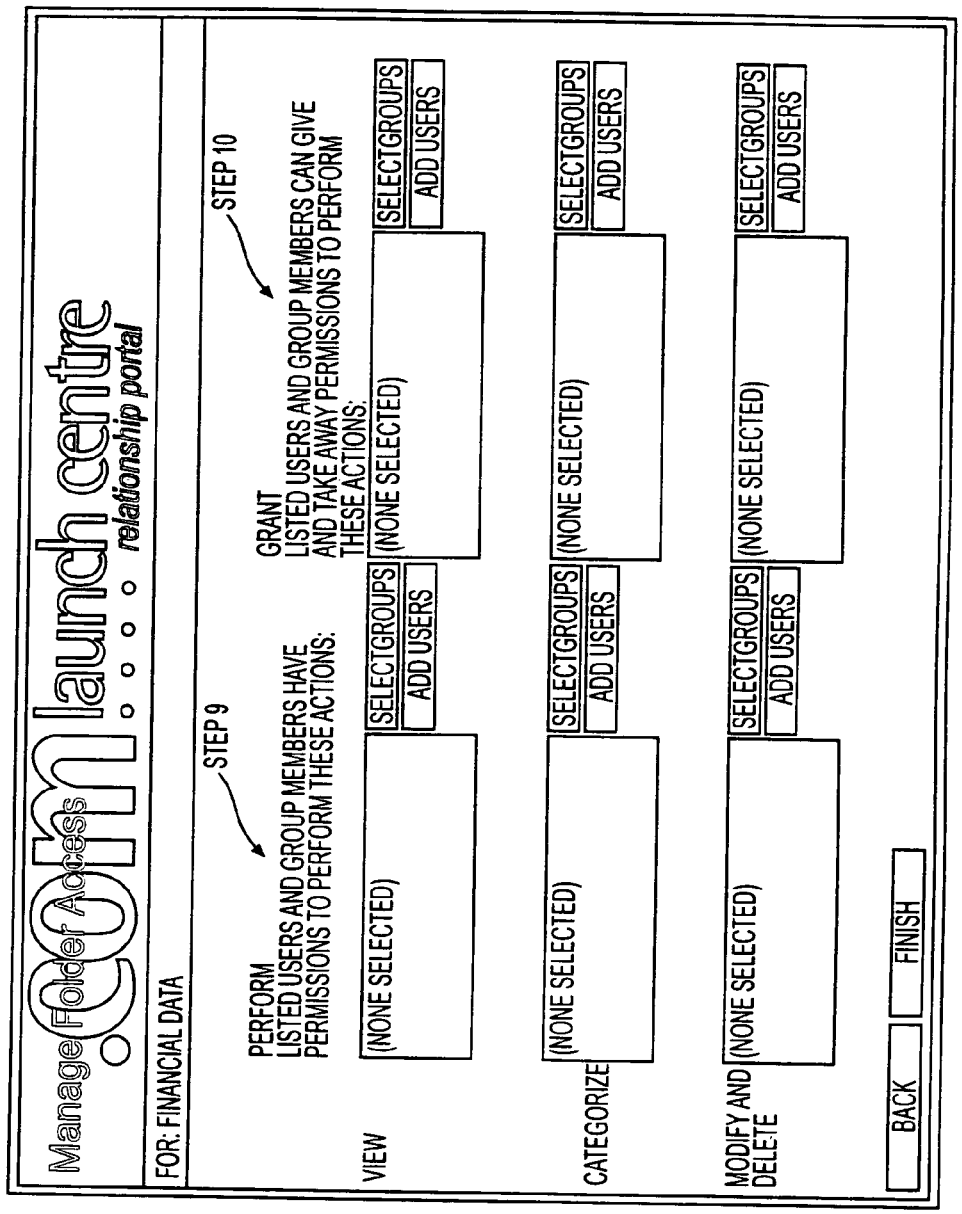
FIG. 18F illustrates a screen for establishing permissions for a folder for an opportunity.

Step 9: With reference to FIG. 18F, the user may select users and groups that will have permissions for this new folder.

Preferably, folder permissions allow portal users to control access to the folders in the catalog. In preferred embodiments, with reference to FIG. 18F, there are six types of catalog folder permission levels.

1. Perform View Access

Preferably, this level of permission allows the portal user to view, but not to modify, the folder and folder information. In preferred embodiments, it also allows the user to see all content of this folder to which the user has permission.

2. Perform Categorize Access

Preferably, this level of permission gives the portal user the same rights as Perform View Access and also the ability to add content to the folder.

3. Perform Modify/Delete Access

Preferably, this level of permission gives the portal user the same rights as Perform Categorize Access and also permission to: 1) change the name of the category; 2) change the folder information; 3) remove content from the folder; 4) move the folder to a different parent folder in the catalog; and/or 5) delete the folder and/or all or none of its contents.

4. Grant View Access

Preferably, this level of permission allows the portal user to give "Perform View Access" permission to others.

5. Grant Categorize Access

Preferably, this level of permission allows the portal user to give "Perform Categorize Access" permission to others.

6. Grant Modify/Delete Access

Preferably, this level of permission allows the portal user to give "Perform Modify/Delete Access" permission to others.

Browsing Content:

In preferred embodiments, content can be browsed using some or all of the following steps.

Step 1: With reference to FIG. 9F, the user may click "file catalog" on the start menu (or, to browse the opportunity file catalog, the user may go to the opportunity profile and click on the file catalog tab).

Step 2: With reference to FIG. 9F, the user may click the sub-menu item "browse."

Figure 18G:
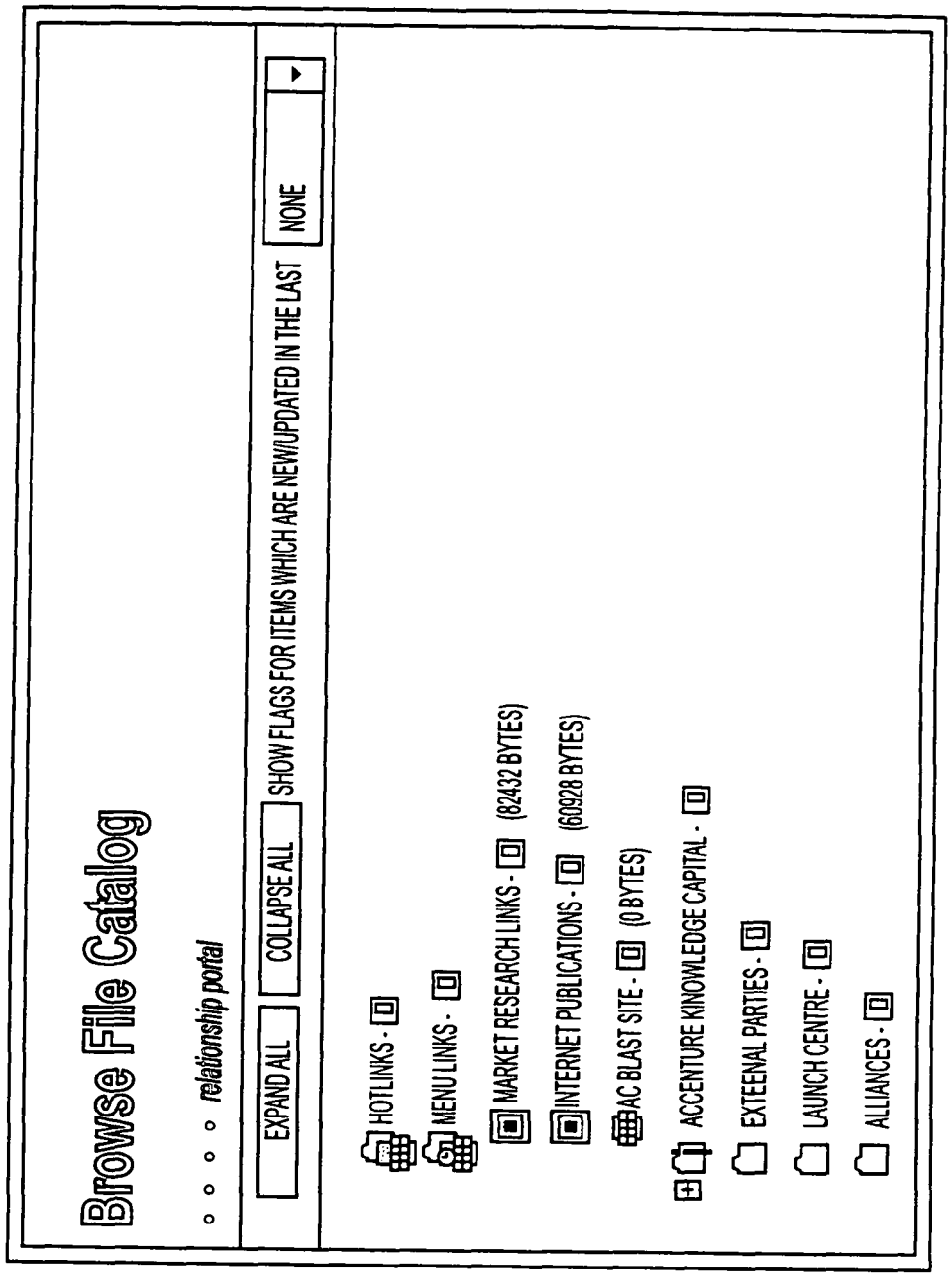
FIG. 18G illustrates a screen for browsing content for an opportunity.

Step 3: With reference to FIG. 18G, the user may click the folder name to open the folder.

Step 4: With reference to FIG. 18G, the user may click the document name to open the document.

Catalog Elements:

In preferred embodiments, one or more of the following catalog elements may be used.

1. Closed Folder

Preferably, the user clicks on this icon to open the folder and view its contents.

2. Closed Inherited Folder

Preferably, this folder functions the same as a closed folder.

3. Open Folder

Preferably, all contents of an open folder will be shown below it. Preferably, a user clicks on this icon to close the folder and to hide its contents.

4. Open Inherited Folder

Preferably, all contents of an open folder will be shown below it. A user preferably clicks on this icon to close the folder and hide its contents.

5. Folder Information

Preferably, clicking on this icon displays general information about the folder and its contents.

6. Content Icons

Preferably, these icons signify the type of content contained in the file catalog. For example, these icons can relate to, e.g., WORD, POWERPOINT, PDF and/or many other document types. Preferably, a user clicks on such icons to view the actual document stored in the catalog. Preferably, clicking on the content name will also open the document.

7. Index Card

Preferably, an index card contains summary information about the content. Preferably, clicking on this icon allows the user to receive general information without taking the time to download and open the entire document.

Illustrative User Scenarios in Some Preferred Embodiments

In the most preferred embodiments of the present invention, when applied in business launch center environments, a variety of beneficial business methodologies can be carried out. A number of illustrative methodologies enabled by some preferred embodiments of the invention are described below. It should be appreciated that the following scenarios are just some illustrative cases and that numerous other scenarios may take place with respect to each and every embodiment of the invention.

Illustrative Candidate Entry Scenarios:

In an illustrative case, a venture capitalist (VC) may enter a new candidate company into the portal, such as a new dot-com company. (NB: in some preferred embodiments, a venture capitalist is a launch center partner that is given permission to enter candidates into the system.) The VC may specify the launch center location, the launch center owner, the company information and the contact information. This sets up the company and user profile. The VC may also upload any relevant documents into a content catalog folder that has been automatically created for the opportunity candidate. The VC may also initiate a discussion about the candidate. The VC may also subscribe to the opportunity profile form to receive notifications when status changes for the candidate.

Then, the launch center owner (LC owner) receives an alert about the new candidate via the portal system. The LC owner may enter additional information into the opportunity profile (e.g., possibly identifying LC Partner and market/operating unit [MU/OU] sponsors). The LC owner may also enable the candidate's contact login capability in the user profile. Preferably, this automatically sends an e-mail notification to the candidate, such as for example, "Welcome to Launch Center Portal" along with related information. The LC owner may also create tasks for the prospect to upload additional information into content catalog.

Then, the candidate company contact receives an e-mail with its username and password and enters (i.e., logs in) the portal. Preferably, the contact learns about the portal by accessing a glossary. The contact may upload additional information and/or documents into company specific folders in the content catalog (e.g., including, for example, a business plan, a venture history, valuation documents). Preferably, the candidate sends an alert to the LC owner stating that new information has been uploaded. Alternatively, if the LC owner had subscribed to the candidate folders, he/she would be automatically alerted of a change in contents.

Illustrative Information Gathering Scenarios:

The LC owner reviews information that has been posted and performs additional research. The LC owner may change the status to "information gathering" on the opportunity profile page (e.g., all subscribers receive a notification). The LC owner may also associate hotlinks (e.g., to competitors, market research, etc.), documents and/or other information to the opportunity card. The LC owner may also create a discussion and/or replies to a discussion about the candidate. The LC owner may also identify a market/operating unit partner sponsor and enable login (e.g., if not already done)—i.e., an e-mail with a login ID and password will be returned. If it is already set up in system, then the LC owner may send an alert about the candidate with appropriate documentation, discussions, etc., associated with the alert.

The venture capitalist preferably receives a notification that the company's status has changed to information gathering.

The market/operating unit partner preferably receives e-mail or an alert. This partner preferably reviews the associated documentation (e.g., business plans, financials, etc.), reviews discussions, etc. This partner preferably contributes to discussions, okays support for the candidate, suggests next steps, and requests additional information.

Meanwhile, the various LC owners may meet periodically (e.g., weekly) to share information and discuss each other's deals. The LC owners can preferably review each other's deals via opportunity profiles, pipeline reports and/or scorecard reports. The LC owners can update information in the opportunity profiles information throughout this meeting. The LC owners may update the status of companies for pipeline reporting.

The LC owner gathers appropriate information to create/update scorecards (e.g., potentially with the collaboration of others involved). The LC owner sends an alert to an LC partner with an update and with associated documents and links from the above meeting.

The LC partner receives the alert with the associated documents and links from the above meeting. The LC partner reviews documents, opportunity financials, scorecard reports and/or pipeline reports specific to the companies she owns. The LC partner may subscribe to the opportunity profile of other candidates she is interested in. The LC partner may create and/or reply to discussions about one or more candidate. The LC partner may review the pipeline to see the stage at which all of her companies are in the life cycle of a deal. The LC partner may review dead opportunities to understand why and at what stage the deal ended.

Various appropriate members may contribute to on-going collaborative discussions. In addition, a market/operating unit partner (MU/OU partner) may begin a discussion with a candidate. The partner may send an alert to the candidate contact to express interest and to begin discussions (NB: the discussion and information gathering will include LC owner).

The LC owner updates the opportunity profile page and the scorecard with information gathered. The LC owner arranges a face-to-face meeting with the candidate and invites all interested parties (e.g., the LC partner, the MU/OU partner, etc.)

The MU/OU partner arranges for technical review of company product (e.g., performed by the operating unit SME). The MU/OU partner may send a task to the company requesting that it upload technical documentation. The MU/OU partner may send an alert to the operating unit SME (e.g., if it is not set-up in the system, then the LC owner will add a user).

The candidate company contact receives the task. The contact uploads the technical documentation into the catalog. The contact sends an alert to the operating unit SME to notify her of the posting of the technical documentation.

The operating unit SME receives the alerts from the MU/OU partner and the candidate company. The SME reviews the technical documentation. The SME initiates discussions surrounding the company's technology. The SME creates a technical summary and uploads it into the catalog (e.g., under a technical documents folder). The SME updates an opportunity scorecard with pertinent information. The SME sends an alert to notify the LC owner that review has been completed and the SME gives support for the candidate company.

The LC owner wraps up the information gathering stage. The LC owner updates the opportunity profile (e.g., changes the status to deal shaping and a notification goes to all of the subscribed parties), the opportunity financials, and the scorecard. The LC owner contacts its company for an opinion of the company (if second opinion is used). The LC owner sends an alert to the LC partner to notify that the due diligence and technical review are complete.

The LC partner receives the alert. The LC partner assigns a deal shaper (e.g., this could be same individual as the LC owner) and sends an alert to the deal shaper (e.g., if not in system, then the LC owner will add a user), the LC owner and the candidate company.

Illustrative Deal Shaping Scenarios:

The deal shaper receives an alert and gets up to speed on the candidate company. The deal shaper reviews existing information (e.g., opportunity profile, opportunity financials, scorecards, other documentation, past discussions, etc.). The deal shaper creates discussions with the LC owner about the company regarding transition of knowledge. The deal shaper sends an alert to the client and to the LC owner to set-up a meeting.

An iterative process between the deal shaper, the LC owner, the candidate company and the LC partner takes place to obtain the following information: terms of the deal, services to be provided, pricing, business terms, costs and/or value. The portal enables collaboration between parties via: discussions, alerts; document uploads; etc.

An iterative process occurs between the deal shaper, the LC owner, the LC partner, the candidate company and the MU/OU sponsor to obtain the following information: investment amount, total shares and/or kinds of shares. The portal enables collaboration between parties via: discussions, alerts; document uploads; etc. The deal shaper updates the opportunity financials (e.g., subscriptions). The deal shaper sends a task to its legal department for review of opportunity financials.

The legal department receives the task and acts on it. The legal department reviews opportunity financials and additional documentation. The legal department starts discussions with the company and the deal maker. The legal department uploads the legal documentation into a company legal documentation folder.

The deal shaper sends an alert to marketing group to notify about the upcoming opportunity. The marketing group receives the alert and starts researching information in the portal and begins discussions with all deal members (e.g., providing a head start on a press release). The deal shaper begins alerts/discussions/documents sharing with the MU/OU unit sponsor to work out project details, such as: work location; time frame; skills necessary; and/or services delivered.

Illustrative Closing Scenarios:

The deal shaper negotiates final "terms and conditions" with the candidate company and the legal department via discussions. The deal shaper collaborates with the deal members to complete coordinates agreements. The deal shaper uploads "letter of content," "letter of intent," "consulting service agreement," "engagement letter," "stock purchase agreement," "alliance agreement" and/or "MSA." The deal shaper sends an alert to the deal members to notify all members of the finalized deal documentation. The LC owner and/or deal maker updates the opportunity profile.

Once again, the foregoing user scenarios merely illustrate some potential scenarios in some preferred embodiments of the invention and various other scenarios may take place doing the use of each and every embodiment of the invention.

While illustrative embodiments of the invention have been described herein, it will be appreciated that the present invention is not limited to the various preferred embodiments described herein, but includes any and all embodiments having modifications, omissions, combinations (e.g., of aspects across various embodiments), adaptations and/or alterations as would be appreciated by those in the art based on the present disclosure. The appended claims are to be interpreted broadly based the language employed in the claims and not improperly limited to illustrative examples described in the present specification or in the prosecution of the application. For example, in the present disclosure, the term "preferably" is non-exclusive and means "preferably, but not limited to." Means-plus-function or step-plus-function limitations will only be employed where for a specific claim limitation all of the following conditions are present in that limitation: a) "means for" or "step for" is expressly recited; b) a corresponding function is expressly recited; and c) no structure, material or acts are recited in support of that function.

The invention claimed is:

1. A computer system for providing a business-to-business relationship portal comprising:
a network of computers including a server; and
a computer-readable medium storing instructions comprising a portal application,
wherein the server is configured to access the computer-readable medium and to execute the instructions;
wherein the portal application is configured to connect to:
an opportunities application configured to maintain identification information for a business opportunity, wherein the identification information comprises: an opportunity owner, a primary contact, and an opportunity profile;
a tasks application configured to assign, track, and display tasks related to the business opportunity;
a catalog application configured to provide access to public and private documents related to the business opportunity;
wherein the portal application is configured to display the identification information, the tasks, and the public documents to an external user;
wherein the portal application is configured to display, to an internal user, an opportunities action related to the external user modifying the identification information maintained by the opportunities application;
wherein the portal application is configured to accept, from the internal user, an opportunities permission input for permitting the external user to perform the opportunities action;
wherein the portal application is configured to accept, from the external user, information related to the opportunities action based on the opportunities permission input; and
wherein the portal application is configured to accept from an authorized user a request for the creation of a new opportunity and in response, to create the opportunity and automatically place at least one of the opportunity owner and the primary contact into a contact list associated with the opportunity, wherein the contact list determines default access permission and default modification permission of users associated with the opportunity.

2. The computer system of claim 1,
wherein the portal application is configured to display, to the internal user, a document action related to the external user creating or editing the public and private documents;
wherein the portal application is configured to accept, from the internal user, a documents permission input for permitting the external user to perform the document action; and
wherein the portal application is configured to accept, from the external user, information related to the document action based on the document permission input.

3. The computer system of claim 2,
wherein the portal application is configured to display, to the internal user, a task action related to the external user creating, editing, or assigning at least one of the tasks;
wherein the portal application is configured to accept, from the internal user, a task permission input for permitting the external user to perform the task action; and
wherein the portal application is configured to accept, from the external user, information related to the task action based on the task permission input.

4. The computer system of claim 1,
wherein the portal application is configured to display, to the internal user, a task action related to the external user creating, editing, or assigning at least one of the tasks;
wherein the portal application is configured to accept, from the internal user, a task permission input for permitting the external user to perform the task action; and
wherein the portal application is configured to accept, from the external user, information related to the task action based on the task permission input.

5. The computer system of claim 1, wherein the portal application configured to accept, from the external user, information related to the opportunities action further comprises the portal application being configured to provide an opportunities permission output that permits access by the external user to the opportunities application to perform the opportunities action.

6. The computer system of claim 1, wherein the portal application further comprises a briefing page application configured to display a briefing page that includes at least one link to other applications associated with the portal application, wherein the briefing page is configured to be customizable by a user.

7. The computer system of claim 1,
wherein the opportunities application is further configured to facilitate creation by authenticated users of the contact list of users associated with the business opportunity,
wherein the opportunities action comprises a contact list action related to a external user modifying the contact list;
wherein the opportunities permission input comprises a contact list permission input for permitting the external user to perform the contact list action; and
wherein the portal application is configured to accept, from the external user, information related to the contact list action based on the contact list permission input.

8. The computer system of claim 1, further comprising logic configured to associate the tasks and the public and private documents with the business opportunity.

9. The computer system of claim 1, further comprising logic configured to create and modify an opportunities object for associating the business opportunity, the tasks, the public and private documents, and the permission inputs.

10. The computer system of claim 1,
wherein the identification information further comprises a coach, and
wherein the automatically placing at least one of the opportunity owner and primary contact into a contact list is further characterized by automatically placing at least one of the opportunity owner, the primary contact, and the coach into a contact list associated with the opportunity.

11. A method for providing a business-to-business relationship portal comprising:
providing a computer having a computer-readable medium to store instructions comprising a portal application,
accessing the instructions by the computer;
executing the instructions by the computer to perform:
connecting to an opportunities application to maintain identification information for a business opportunity, wherein the identification information comprises: an opportunity owner, a primary contact, and an opportunity profile;
connecting to a tasks application to assign, track, and display tasks related to the business opportunity; and
connecting to a catalog application to provide access to public and private documents related to the business opportunity;
displaying the identification information, the tasks, and the public documents to an external user;
displaying, to an internal user, an opportunities action related to the external user modifying the identification information maintained by the opportunities application;
accepting, from the internal user, an opportunities permission input for permitting the external user to perform the opportunities action;
accepting, from the external user, information related to the opportunities action based on the opportunities permission input; and
accepting from an authorized user a request for the creation of a new opportunity and in response, to create the opportunity and automatically place at least one of the opportunity owner and the primary contact into a contact list associated with the opportunity, wherein the contact list determines default access permission and default modification permission of users associated with the opportunity.

12. The method of claim 11, wherein executing the instructions further comprises:
displaying, to the internal user, a document action related to the external user creating or editing the public and private documents;
accepting, from the internal user, a documents permission input for permitting the external user to perform the document action; and
accepting, from the external user, information related to the document action based on the document permission input.

13. The method of claim 12, wherein executing the instructions further comprises:
displaying, to the internal user, a task action related to the external user creating, editing, or assigning at least one of the tasks;
accepting, from the internal user, a task permission input for permitting the external user to perform the task action; and
accepting, from the external user, information related to the task action based on the task permission input.

14. The method of claim 11, wherein executing the instructions further comprises:
displaying, to the internal user, a task action related to the external user creating, editing, or assigning at least one of the tasks;
accepting, from the internal user, a task permission input for permitting the external user to perform the task action; and
accepting, from the external user, information related to the task action based on the task permission input.

15. The method of claim 11, wherein accepting, from the external user, information related to the opportunities action further comprises providing an opportunities permission output that permits access by the external user to the opportunities application to perform the opportunities action.

16. The method of claim 11,
wherein the opportunities application is configured to facilitate creation by authenticated users of the contact list of users associated with the business opportunity,
wherein the opportunities action comprises a contact list action related to the external user modifying the contact list;
wherein the opportunities permission input comprises a contact list permission input for permitting the external user to perform the contact list action; and
wherein executing the instructions further comprises accepting, from the external user, information related to the contact list action based on the contact list permission input.

17. The method of claim 11, further comprising providing subscriptions to provide, to authorized users, updates to the identification information, the tasks, the public and private documents.

18. The method of claim 11,
wherein the identification information further comprises a coach, and
wherein the automatically placing at least one of the opportunity owner and the primary contact into a contact list is further characterized by automatically placing at least one of the opportunity owner, the primary contact, and the coach into a contact list associated with the opportunity.

19. A computer program embodied on a non-transitory computer readable medium for providing a business-to-business relationship portal, wherein the computer program instructs a computer to perform a method comprising:

accessing instructions for a portal application stored in a memory; and executing, by the computer, the instructions to perform:
- connecting to an opportunities application to maintain identification information for a business opportunity, wherein the identification information comprises: an opportunity owner, a primary contact, and an opportunity profile;
- connecting to a tasks application to assign, track, and display tasks related to the business opportunity; and
- connecting to a catalog application to provide access to public and private documents related to the business opportunity;
- displaying the identification information, the tasks, and the public documents to an external user;
- displaying, to an internal user, an opportunities action related to the external user modifying the identification information maintained by the opportunities application;
- accepting, from the internal user, an opportunities permission input for permitting the external user to perform the opportunities action;
- accepting, from the external user, information related to the opportunities action based on the opportunities permission input; and
- accepting, from an authorized user, a request for the creation of a new opportunity and in response, to create the opportunity and automatically place at least one of the opportunity owner and the primary contact into a contact list associated with the opportunity, wherein the contact list determines default access permission and default modification permission of users associated with the opportunity.

20. The computer program of claim 19, wherein the method further comprises executing the instructions to:
- display, to the internal user, a document action related to the external user creating or editing the public and private documents;
- accept, from the internal user, a documents permission input for permitting the external user to perform the document action; and
- accept, from the external user, information related to the document action based on the document permission input.

21. The computer program of claim 20, wherein the method further comprises executing the instructions to:
- display, to the internal user, a task action related to the external user creating, editing, or assigning at least one of the tasks;
- accept, from the internal user, a task permission input for permitting the external user to perform the task action; and
- accept, from the external user, information related to the task action based on the task permission input.

22. The computer program of claim 19, wherein the method further comprises executing the instructions to:
- display, to the internal user, a task action related to the external user creating, editing, or assigning at least one of the tasks;
- accept, from the internal user, a task permission input for permitting the external user to perform the task action; and
- accept, from the external user, information related to the task action based on the task permission input.

23. The computer program of claim 19, wherein accepting, from the external user, information related to the opportunities action further comprises providing an opportunities permission output that permits access by the external user to the opportunities application to perform the opportunities action.

24. The computer program product of claim 19, wherein the method further comprises executing the instructions to provide subscriptions to provide, to authorized users, updates to the identification information, the tasks, the public and private documents.

25. The computer program of claim 19,
- wherein the identification information further comprises a coach, and
- wherein the automatically placing at least one of the opportunity owner and the primary contact into a contact list is further characterized by automatically placing at least one of the opportunity owner, the primary contact, and the coach into a contact list associated with the opportunity.

* * * * *

UNITED STATES PATENT AND TRADEMARK OFFICE
CERTIFICATE OF CORRECTION

PATENT NO. : 8,719,173 B2
APPLICATION NO. : 10/259840
DATED : May 6, 2014
INVENTOR(S) : John Beisty et al.

It is certified that error appears in the above-identified patent and that said Letters Patent is hereby corrected as shown below:

On the Title Page, Item (75), in the Inventors, lines 7-8,
"Woodruff W. Driggs, II, Wellesley, MA (US)" should read
--Woodruff W. Driggs II, Wellesley, MA (US)--.

In the Claims

In claim 7, column 31, line 7, "a external" should read --an external--.

In claim 17, column 32, lines 53-54, "the tasks, the public and private documents."
should read --the tasks, and the public and private documents.--.

In claim 24, column 34, lines 31-32, "the tasks, the public and private documents."
should read --the tasks, and the public and private documents.--.

Signed and Sealed this
Twelfth Day of August, 2014

Michelle K. Lee
*Deputy Director of the United States Patent and Trademark Office*